United States Patent
Chen et al.

(10) Patent No.: US 12,240,162 B2
(45) Date of Patent: Mar. 4, 2025

(54) INJECTION MOLDING SYSTEM AND INJECTION MOLDING METHOD

(71) Applicant: OTRAJET INC., Taichung (TW)

(72) Inventors: Ching-Hao Chen, Taichung (TW); Liang-Hui Yeh, Taichung (TW)

(73) Assignee: OTRAJET INC., Taichung (TW)

( * ) Notice: Subject to any disclaimer, the term of this patent is extended or adjusted under 35 U.S.C. 154(b) by 0 days.

(21) Appl. No.: 18/062,240

(22) Filed: Dec. 6, 2022

(65) Prior Publication Data

US 2024/0181691 A1   Jun. 6, 2024

(51) Int. Cl.
| | | |
|---|---|---|
| B29C 45/77 | (2006.01) | |
| B29C 45/00 | (2006.01) | |
| B29C 45/07 | (2006.01) | |
| B29C 45/12 | (2006.01) | |

(Continued)

(52) U.S. Cl.
CPC .......... *B29C 45/77* (2013.01); *B29C 45/0001* (2013.01); *B29C 45/07* (2013.01); *B29C 45/12* (2013.01); *B29C 45/1816* (2013.01); *B29C 2945/76006* (2013.01); *B29C 2945/76257* (2013.01); *B29C 2945/76381* (2013.01); *B29C 2945/76498* (2013.01);

(Continued)

(58) Field of Classification Search
CPC ...... B29C 45/07; B29C 45/12; B29C 45/1816
USPC ...................................................... 264/40.3
See application file for complete search history.

(56) References Cited

U.S. PATENT DOCUMENTS 3,464,091 A * 9/1969 Bielfeldt ............... B29C 45/076
 425/589
4,952,365 A   8/1990 Shibuya et al.
(Continued)

FOREIGN PATENT DOCUMENTS

CN     112208053 A   1/2021
EP        3763505 A1   1/2021
(Continued)

OTHER PUBLICATIONS

Search Report from the European Patent Office of EP patent application No. 23214214.1 dated Mar. 13, 2024.
(Continued)

*Primary Examiner* — S. Behrooz Ghorishi
*Assistant Examiner* — Gregory C. Grosso
(74) *Attorney, Agent, or Firm* — WPAT LAW; Anthony King

(57) ABSTRACT

An injection molding system includes an extruding system, a discharging channel, a molding device including a first and second mold cavities, and a pressure regulating system regulates pressures inside the first and second mold cavities. An injection molding method includes providing a molding device having a first and second mold cavities, a first feeding port in communication with the first mold cavity, and a second feeding port in communication with the second mold cavity; sensing a first pressure in the first mold cavity, and injecting a first gas into the first mold cavity until the first mold cavity is sensed to have a first predetermined pressure; and sensing a second pressure in the second mold cavity, and injecting a second gas into the second mold cavity until the second mold cavity is sensed to have a second predetermined pressure, wherein the first and second predetermined pressures are different.

20 Claims, 29 Drawing Sheets

(51) Int. Cl.
  *B29C 45/18* (2006.01)
  *B29K 105/00* (2006.01)
(52) U.S. Cl.
  CPC .............. *B29C 2945/76735* (2013.01); *B29C 2945/76859* (2013.01); *B29K 2105/0005* (2013.01)

(56) References Cited

U.S. PATENT DOCUMENTS

| | | | | |
|---|---|---|---|---|
| 6,099,769 | A * | 8/2000 | Koch | B29C 44/388 |
| | | | | 264/328.8 |
| 2005/0012243 | A1* | 1/2005 | Saeki | B29C 45/0025 |
| | | | | 264/328.8 |
| 2007/0052124 | A1 | 3/2007 | Park et al. | |
| 2019/0389100 | A1* | 12/2019 | Lin | B29C 44/588 |
| 2021/0347958 | A1* | 11/2021 | Minnich | B29C 44/422 |

FOREIGN PATENT DOCUMENTS

| | | |
|---|---|---|
| EP | 3789176 A1 | 3/2021 |
| EP | 4140682 A1 | 3/2023 |
| JP | 2020026074 A | 2/2020 |
| JP | 2021014115 A | 2/2021 |
| TW | M607840 U | 2/2021 |
| TW | 202110610 A | 3/2021 |
| TW | M634377 U | 11/2022 |
| TW | M653651 U | 4/2024 |

OTHER PUBLICATIONS

Office Action, Cited References and Search Report dated Jul. 30, 2024 issued by the Japan Intellectual Property Office for the JP patent application No. 2023-107182.

Office action, Cited References and Search Report dated Aug. 2, 2024 issued by the Taiwan Intellectual Property Office for the Taiwan Counterpart Application No. 112147320.

Office Action dated Jul. 8, 2024 issued by the China Intellectual Property Office for CN application No. 202323321215.7.

Final office action, Cited References and Search report dated Oct. 21, 2024 issued by the Taiwan Intellectual Property Office (TIPO) for the Taiwanese counterpart application No. 112147320.

* cited by examiner

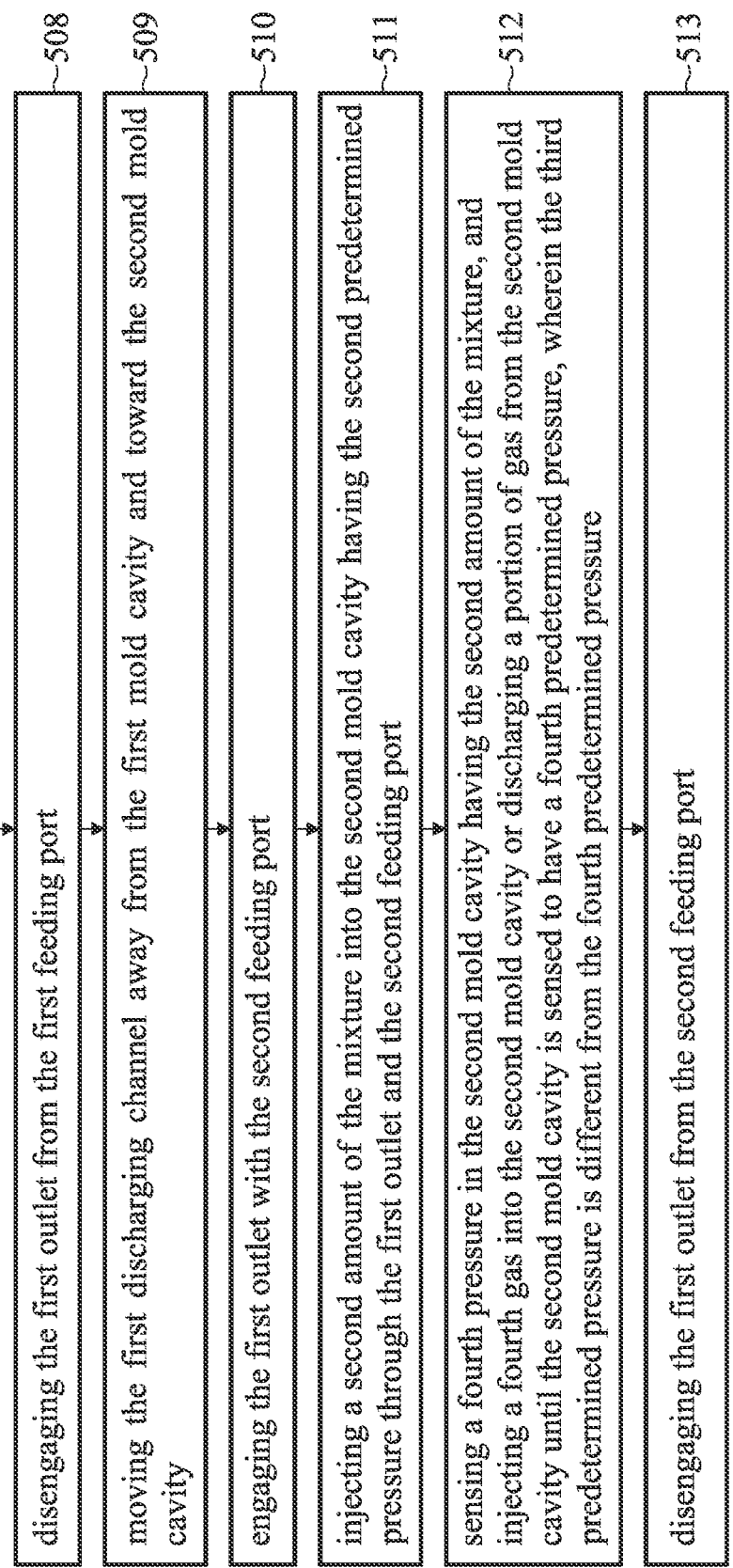

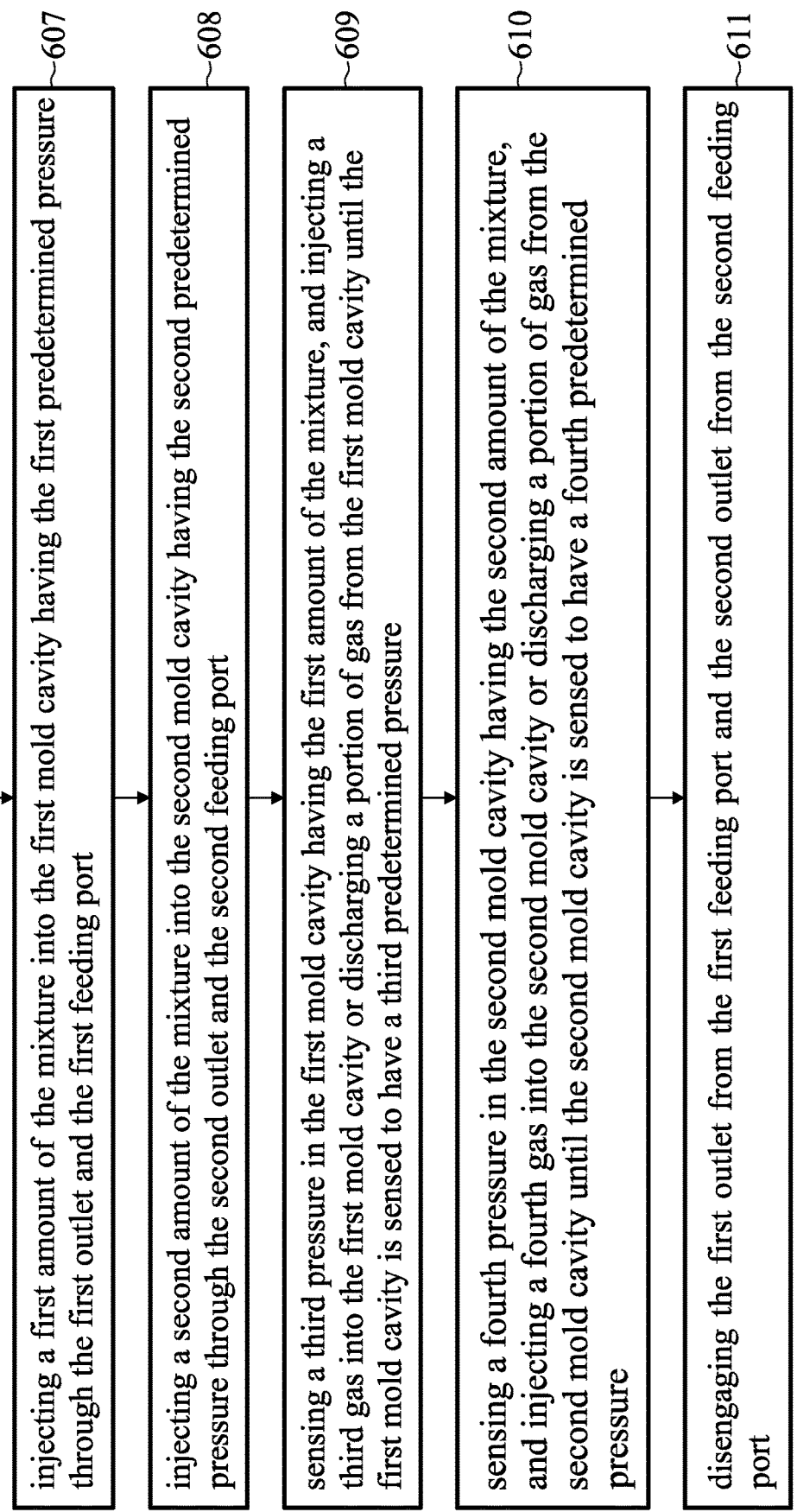

INJECTION MOLDING SYSTEM AND INJECTION MOLDING METHOD

TECHNICAL FIELD

The present invention is related to an injection molding system and an injection molding method, and, in particular, to an injection molding system and an injection molding method using a molding device having a plurality of mold cavities with different pressure.

BACKGROUND

Foamed polymeric material has many advantages, such as high strength, low weight, impact resistance, thermal insulation, and others. Foamed polymeric articles can be made by injection molding or extrusion molding. For example, after the polymeric material is melted and mixed with a blowing agent to form a mixture, a force or pressure is applied to the mixture to inject or extrude the mixture into a mold cavity of a mold, and the mixture is foamed in the mold cavity to form the foamed polymeric article. There is a need to provide foamed polymeric articles with desirable properties.

BRIEF SUMMARY OF THE INVENTION

One purpose of the present invention is to provide an injection molding system and a method of injection molding.

According to one embodiment of the present disclosure, an injection molding system is disclosed. The injection molding system includes an extruding system, a first discharging channel, a molding device, and a pressure regulating system.

The extruding system is configured to produce a mixture of a polymeric material and a blowing agent. The first discharging channel communicable with the extruding system and including a first outlet configured to discharge the mixture from the extruding system. The molding device configured to receive the mixture from the first outlet. The pressure regulating system coupled to the molding device. The molding device includes a first mold cavity, a second mold cavity separated from the first mold cavity, a first feeding port communicable with the first mold cavity and engagable with the first outlet, a second feeding port communicable with the second mold cavity and engageable with the first outlet, and the pressure regulating system is configured to regulate pressures inside the first mold cavity and the second mold cavity.

According to one embodiment of the present disclosure, an injection molding method is disclosed. The method includes providing a molding device, wherein the molding device includes a first mold cavity and a second mold cavity, a first feeding port in communication with the first mold cavity, and a second feeding port in communication with the second mold cavity; sensing a first pressure in the first mold cavity, and injecting a first gas into the first mold cavity until the first mold cavity is sensed to have a first predetermined pressure; and sensing a second pressure in the second mold cavity, and injecting a second gas into the second mold cavity until the second mold cavity is sensed to have a second predetermined pressure, wherein the first predetermined pressure is different from the second predetermined pressure.

According to one embodiment of the present disclosure, another injection molding method is disclosed. The method includes providing an extruding system configured to produce a mixture of a polymeric material and a blowing agent, a discharging channel communicable with the extruding system and including an outlet, wherein the outlet is engageable with the first feeding port and the second feeding port; providing a molding device, wherein the molding device includes a first mold cavity and a second mold cavity, a first feeding port in communication with the first mold cavity, and a second feeding port in communication with the second mold cavity; engaging the outlet with the first feeding port; injecting a first amount of the mixture into the first mold cavity through the outlet and the first feeding port; and disengaging the outlet from the first feeding port. The method further includes engaging the outlet with the second feeding port; injecting a second amount of the mixture into the second mold cavity through the outlet and the second feeding port; disengaging the outlet from the second feeding port; sensing a first pressure in the first mold cavity having the first amount of the mixture, and injecting a first gas into the first mold cavity or discharging a portion of gas from the first mold cavity until the first mold cavity is sensed to have a first predetermined pressure; and sensing a second pressure in the second mold cavity having the second amount of the mixture, and injecting a second gas into the second mold cavity or discharging a portion of gas from the second mold cavity until the second mold cavity is sensed to have a second predetermined pressure. The first predetermined pressure is different from the second predetermined pressure.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 11A and FIG. 11B collectively illustrate a flowchart of an injection molding method according to one embodiment of the present invention.

FIG. 20A and FIG. 20B collectively illustrate a flowchart of an injection molding method according to one embodiment of the present invention.

DETAILED DESCRIPTION

Figure 1:
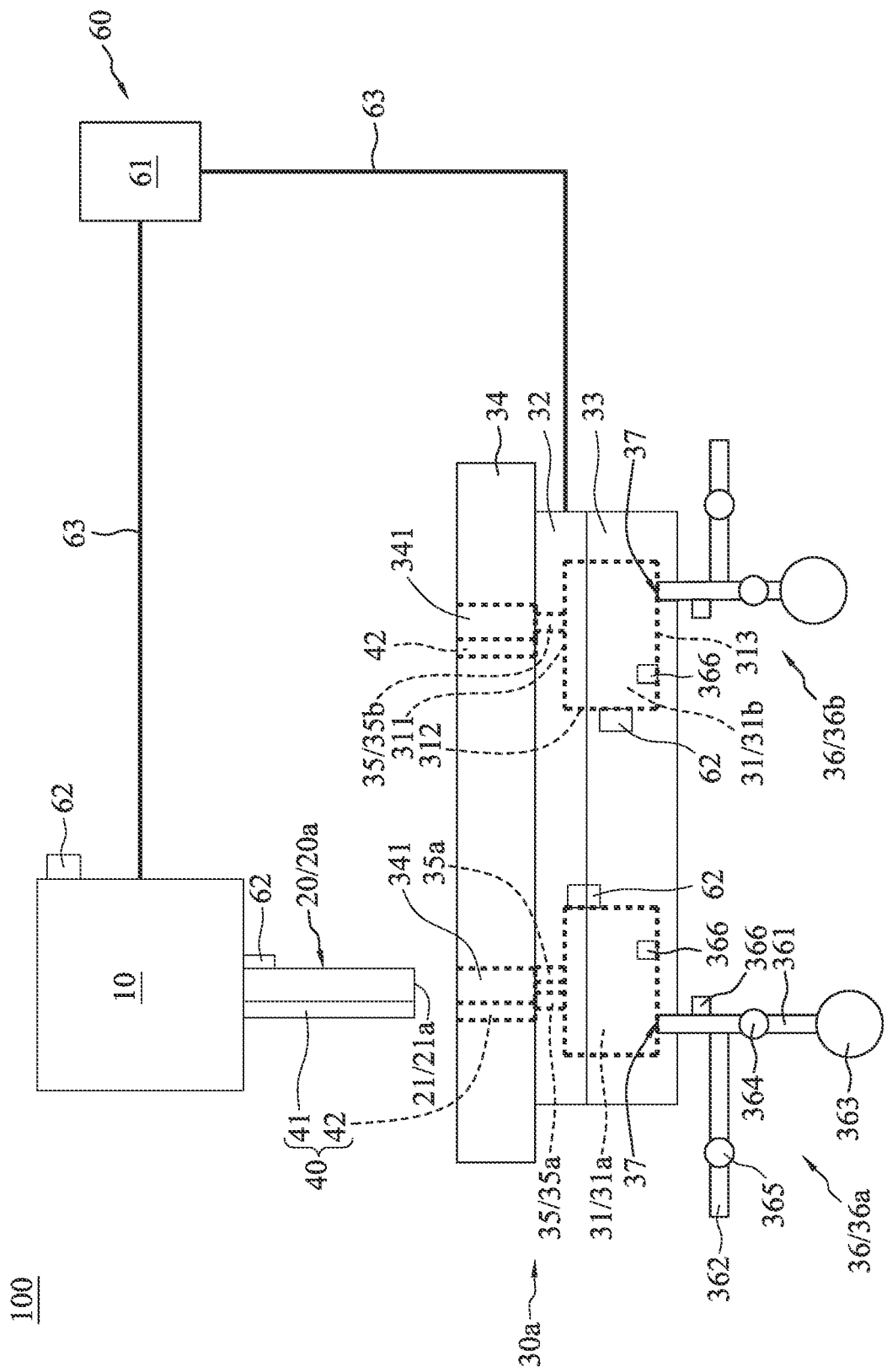
FIG. 1 is a schematic diagram of an injection molding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic diagram view of an injection molding system 100 according to one embodiment of the present invention. The injection molding system 100 includes an extruding system 10, a discharging channel 20, a molding device 30a, and a pressure regulating system 36. The extruding system 10 is configured to produce the mixture of a polymeric material and a blowing agent, and configured to inject the mixture into the discharging channel 20. The extruding system 10 is connected to or communicable with the discharging channel 20. The discharging channel 20 includes an outlet 21 configured to discharge the mixture from the extruding system 10. The discharging channel 20 includes a first discharging channel 20a. In some embodiments, the first discharging channel 20a is communicable with the extruding system 10 and including a first outlet 21a disposed distal to the extruding system 10 and configured to discharge the mixture from the extruding system 10. The molding device 30a is configured to receive the mixture from the first outlet 21 of the first discharging channel 20a. The pressure regulating system 36 is coupled to the molding device 30a.

In some embodiments, the polymeric material includes a high molecular weight polymer. In some embodiments, the polymeric material includes ethylene vinyl acetate (EVA), styrene-ethylene-butylene-styrene (SEBS), thermoplastic polyurethanes (TPU), thermoplastic polyester elastomer (TPEE) or the like. In some embodiments, the polymeric material includes a foamable material. In some embodiments, the blowing agent is a physical or chemical additive that releases gas, thereby forming pores in the thus-obtained foamed polymeric article. In some embodiments, the blowing agent is a physical additive. The physical blowing agent includes an atmospheric gas (e.g., nitrogen or carbon dioxide), a hydrocarbon, a chlorofluorocarbon, a noble gas, or a combination thereof. The blowing agent may be supplied in any flowable physical state, for example, a gas, a liquid, or a supercritical fluid (SCF).

Figure 2:
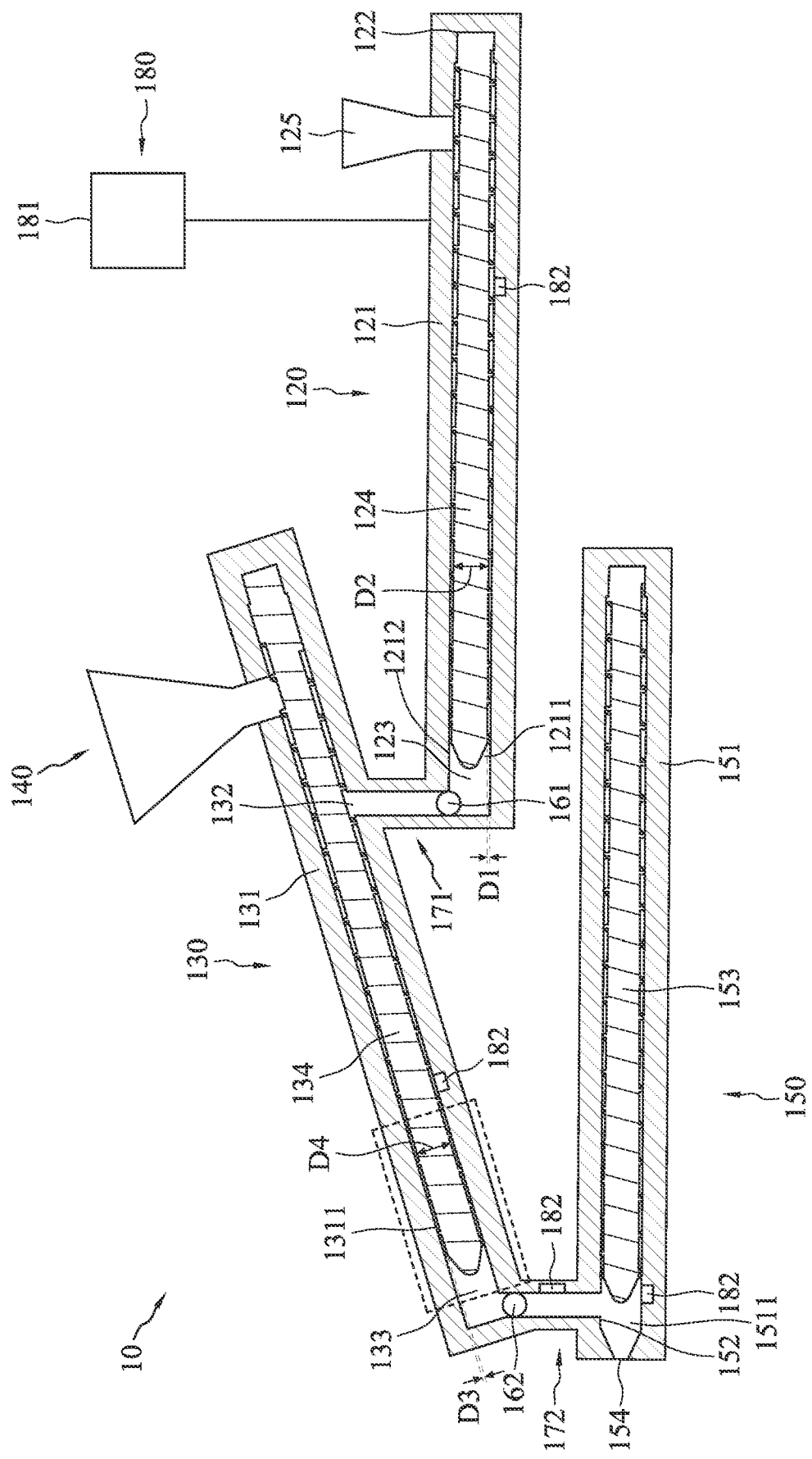
FIG. 2 is a schematic diagram of a portion of an injection molding system in FIG. 1 according to one embodiment of the present invention.

FIG. 2 is a schematic diagram view of the extruding system according to aspects of the present disclosure in some embodiments. The extruding system 10 includes a melting unit 120, a mixing unit 130, a blowing agent supply unit 140, an injection unit 150, a first flow control element 161, a second flow control element 162, and a monitoring module 180.

In some embodiments, referring to FIG. 2, the melting unit 120 is configured to convey the polymeric material. In some embodiments, the melting unit 120 includes a pressing cartridge 121, a first feeding passage 122, a first discharging passage 123, and a pushing member 124. In some embodiments, the melting unit 120 further includes a feeding hopper 125.

In some embodiments, the first feeding passage 122 and the first discharging passage 123 are respectively disposed at two ends of the pressing cartridge 121. In some embodiments, the first feeding passage 122 communicates with an inner space 1211 of the pressing cartridge 121, and the first discharging passage 123 communicates with an external space of the pressing cartridge 121, wherein the first feeding passage 122 is configured to deliver the polymeric material to the inner space 1211 of the pressing cartridge 121. In some embodiments, the feeding hopper 125 is configured to deliver a polymeric material to the inner space 1211 of the pressing cartridge 121 through the first feeding passage 122.

The pushing member 124 is configured to convey the polymeric material from the first feeding passage 122 to the first discharging passage 123. In some embodiments, the pushing member 124 is disposed in the inner space 1211 of the pressing cartridge 121. In some embodiments, the pushing member 124 is disposed in the inner space 1211 of the pressing cartridge 121 between the first feeding passage 122 and the first discharging passage 123, and is used to force the polymeric material toward the first discharging passage 123. In some embodiments, the pushing member 124 is rotatable relative to the pressing cartridge 121. In some embodiments, the polymeric material is conveyed from the first feeding passage 122 to the first discharging passage 123 by rotation of the pushing member 124. In some embodiments, the pushing member 124 is immovable in a direction parallel to the longitudinal axis of the pressing cartridge 121.

In some embodiments, a length of the pushing member 124 extends along a length of the pressing cartridge 121, and a ratio of a distance D1 between an inner sidewall 1212 of the pressing cartridge 121 and the pushing member 124 and a diameter D2 of the pushing member 124 is in a range of about 1:1500 to about 1:4500, and the polymeric material melted by the melting unit 120 may be uniformed. In some embodiments, a shortest distance D1 between an inner sidewall 1212 of the pressing cartridge 121 and the pushing member 124 is substantially equal to or less than 0.3 mm. In some embodiments, the shortest distance D1 between the inner sidewall 1212 of the pressing cartridge 121 and the pushing member 124 ranges between 0.01 and 0.05 mm.

The mixing unit 130 is configured to receive the polymeric material from the melting unit 120 and configured to mix the polymeric material with a blowing agent and to form a mixture of the polymeric material and the blowing agent. The mixing unit 130 includes a hollow mixing cartridge 131, a second feeding passage 132, a second discharging passage 133, and a mixing rotor 134.

The second feeding passage 132 and the second discharging passage 133 are respectively disposed at two ends of the mixing cartridge 131. In some embodiments, the second feeding passage 132 is configured to deliver the polymeric material. In some embodiments, the second discharging passage 133 is configured to discharge the mixture.

The mixing rotor 134 is configured to mix the polymeric material with the blowing agent to form a mixture in the mixing cartridge 131. In some embodiments, the mixing rotor 134 is disposed in the mixing cartridge 131. In some embodiments, the mixing rotor 134 is disposed in the mixing cartridge 131 between the second feeding passage 132 and the second discharging passage 133, so as to agitate the mixture in the mixing cartridge. The mixing rotor 134 is rotatable to mix the polymeric material with the blowing agent and to convey the mixture of the polymeric material and the blowing agent from the second feeding passage 132 to the second discharging passage 133. In some embodiments, the mixing rotor 134 is immovable in a direction parallel to the longitudinal axis of the mixing cartridge 131.

In some embodiments, a length of the mixing rotor 134 extends along a length of the hollow mixing cartridge 131, and a ratio of a shortest distance D3 between an inner sidewall 1311 of the hollow mixing cartridge 131 and the mixing rotor 134 and a diameter D4 of the mixing rotor 134 is in a range of about 1:1500 to about 1:4500, and the mixture prepared by the extruding system 10 may be even and uniformed. In some embodiments, the mixture may be divided in to a plurality of portions, and a ratio of the blowing agent to the polymeric material of each portion of the mixture prepared by the extruding system 10 is substantially constant. In some embodiments, a ratio of the polymeric material to the blowing agent in a first portion of the mixture is substantially equal to a ratio of the polymeric material to the blowing agent in a second portion of the mixture. In some embodiments, the shortest distance D3 between the inner sidewall 1311 of the hollow mixing cartridge 131 and the mixing rotor 134 is substantially equal to or less than 0.3 mm. In some embodiments, the shortest distance D3 between the inner sidewall 1311 of the hollow mixing cartridge 131 and the mixing rotor 134 ranges between 0.01 and 0.09 mm.

Figure 3:
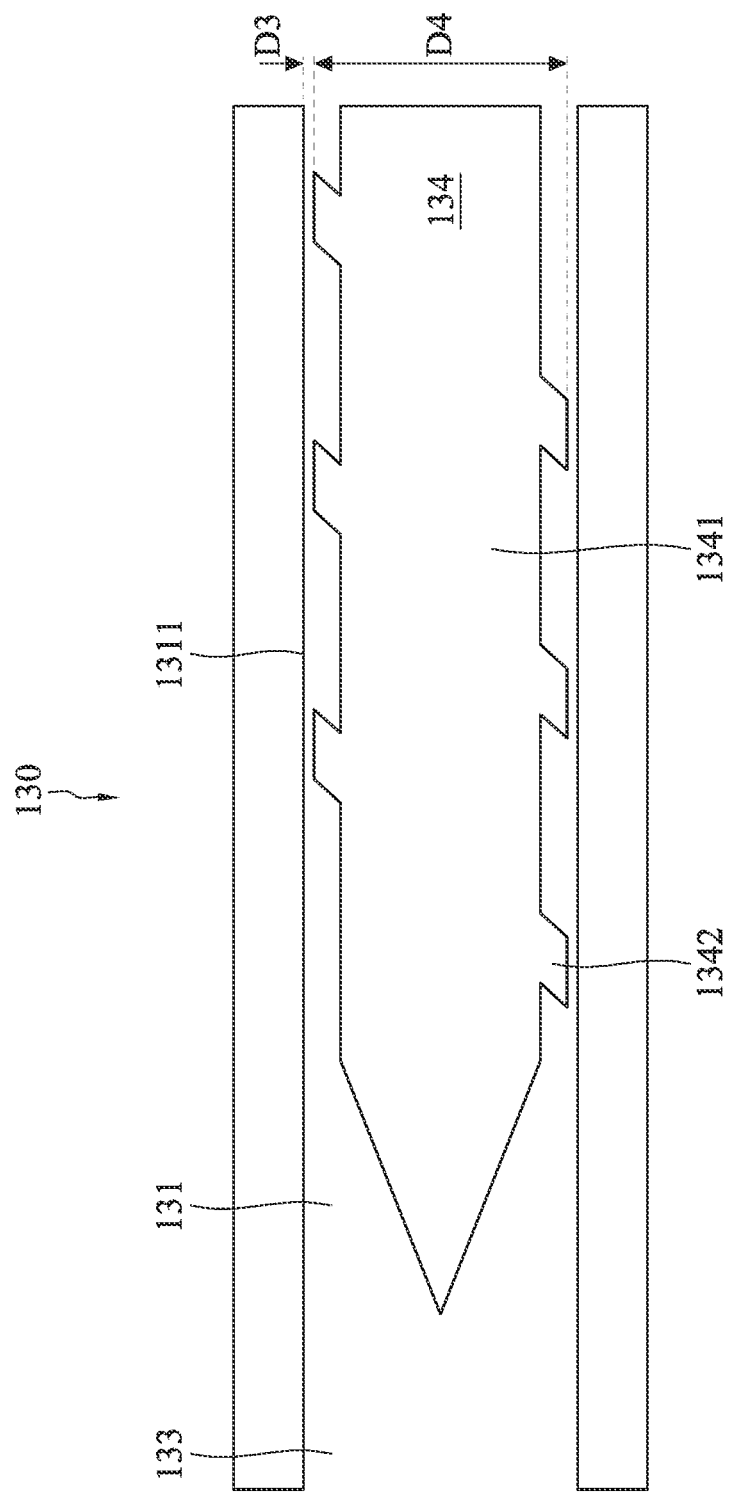
FIG. 3 is an enlarged view of a portion of an injection molding system enclosed by a dash line in FIG. 2 according to one embodiment of the present invention.

FIG. 3 is an enlarge view of a portion of the extruding system according to aspects of the present disclosure in some embodiments. To enable the melted polymeric material and the blowing agent to mix uniformly in the mixing cartridge 131, in some embodiments, referring to FIGS. 2 and 3, the mixing rotor 134 further includes a column-like body 1341 in a cylindrical shape and rotatably disposed in the mixing cartridge 131, and a groove portion 1342 annularly arranged on the periphery of the column-like body 1341. Therefore, when the column-like body 1341 rotates, the polymeric material and the blowing agent are agitated by the groove portion 1342, so as to achieve a desired mixing effect. In some embodiments, the shortest distance D3 is a shortest distance between the groove portion 1342 and the inner sidewall 1311 of the hollow mixing cartridge 131.

In some embodiments, when the shortest distance D3 is a shortest distance between the groove portion 1342 and the inner sidewall 1311 of the hollow mixing cartridge 131, the shortest distance D3 ranges between 0.01 and 0.09 mm. In some embodiments, the diameter D4 of the mixing rotor 134 ranges between the 45 to 75 mm.

In some embodiments, the melting unit 120 includes a hollow pressing cartridge 121 configured to accommodate the polymeric material and having a first pressure, and the mixing unit 130 includes a hollow mixing cartridge 131 having a second pressure. In some embodiments, in order to prevent backflow, the first pressure is greater than the second pressure. In some embodiments, the polymeric material is drawn from the melting unit 120 toward the mixing unit 130 by the difference between the first pressure and the second pressure.

The blowing agent supply unit 140 is connected to the mixing unit 130 and configured to convey the blowing agent into the mixing unit 130. In some embodiments, the blowing agent supply unit 140 is positioned between the first flow control element 161 and the second flow control element 162. In some embodiments, the blowing agent supply unit 140 is disposed proximal to the first flow control element 161 and distal to the second flow control element 162.

In some embodiments, a blowing agent source (not shown) is connected to the blowing agent supply unit 140 and is configured to supply any type of blowing agent known to those of ordinary skill in the art. In some embodiments, the blowing agent is in the supercritical fluid state after being introduced into the mixing unit 130 by the blowing agent supply unit 140.

In some embodiments, the first flow control element 161 is disposed at a first port 171 that connects the melting unit 120 to the mixing unit 130. The first port 171 is configured to introduce the polymeric material from the melting unit 120 into the mixing unit 130. The first port 171 is located between the melting unit 120 and the mixing unit 130. In some embodiments, the first port 171 is configured to introduce the polymeric material from the pressing cartridge 121 of the melting unit 120 into the mixing cartridge 131 of the mixing unit 130. In some embodiments, the polymeric material can be conveyed and/or drawn from the melting unit 120 to the mixing unit 130 through the first port 171 by a pressure difference between the first pressure and the second pressure.

In some embodiments, the first flow control element 161 is disposed between the melting unit 120 and the mixing unit 130 and is configured to control flow of the polymeric material from the melting unit 120 to the mixing unit 130. The first flow control element 161 may be a valve, a movable cover or the like.

In some embodiments, the first flow control element 161 is configured to switch between an open configuration and a closed configuration. The open configuration of the first flow control element 161 allows the polymeric material to flow from the melting unit 120 into the mixing unit 130, and the closed configuration of the first flow control element 161 prevents the polymeric material from flowing from the mixing unit 130 back to the melting unit 120.

In some embodiments, the first flow control element 161 is configured to maintain a pressure difference between the melting unit 120 and the mixing unit 130. In some embodiments, the first flow control element 161 is configured to maintain a pressure difference between the melting unit 120 and the mixing unit 130 by switching between the open configuration and the closed configuration, so that the polymeric material is not able to flow from the mixing cartridge 131 of the mixing unit 130 back to the pressing cartridge 121 of the melting unit 120. In some embodiments, the first flow control element 161 is configured to adjust the first pressure and/or the second pressure in order to maintain the pressure difference between the first pressure and the second pressure. In some embodiments, the first flow control element 161 is in the closed configuration when the first pressure is similar to the second pressure.

In some embodiments, the injection unit 150 is configured to receive the mixture discharged from the second discharging passage 133 of the mixing unit 130 and to discharge the mixture out of the injection unit 150. In some embodiments, the injection unit 150 is configured to inject the mixture, and at least one discharging channel 20 is communicable with the injection unit 150.

In some embodiments, the injection unit 150 includes a hollow metering cartridge 151 configured to accommodate the mixture. The metering cartridge 151 has a hollow inner space 1511, wherein the inner space 1511 is in communication with the second discharging passage 133 and configured to accommodate the mixture. The injection unit 150 further includes a connecting passage 152 in communication with the inner space 1511 of the metering cartridge 151 and a discharging member 153 slidably disposed in the inner space 1511 of the metering cartridge 151 and configured to discharge the mixture out of the metering cartridge 151 through an outlet 154.

In some embodiments, referring back to FIG. 1, the discharging channel 20 corresponds to one extruding system 10. The mixture is flowed from one extruding system 10 or the outlet 154 into the discharging channel 20.

Figure 4:
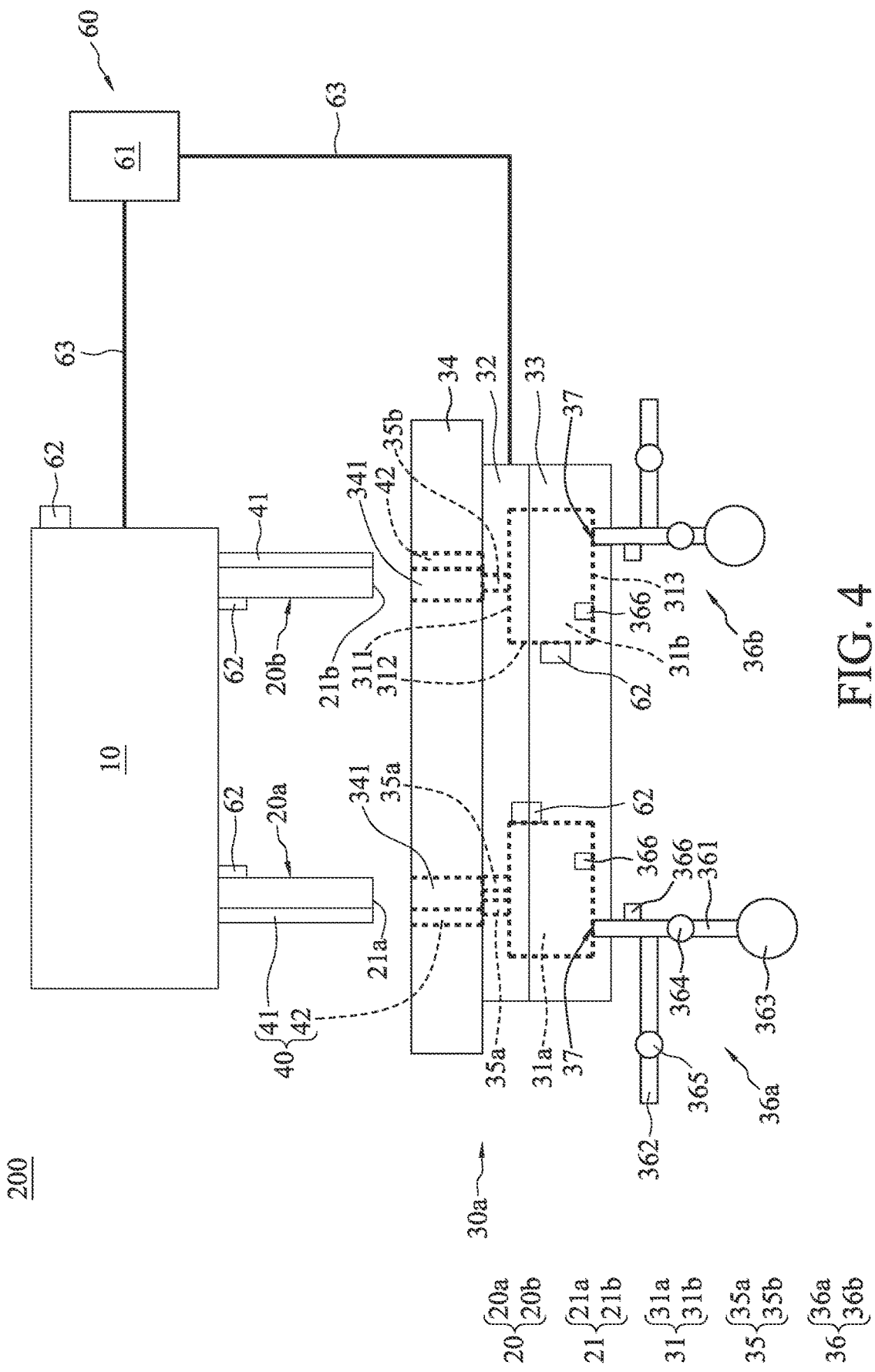
FIG. 4 is a schematic diagram of an injection molding system according to one embodiment of the present invention.

FIG. 4 is a schematic diagram view of an injection molding system 200 according to one embodiment of the present invention. In some embodiments, referring to FIG. 4, the injection molding system 200 includes a plurality discharging channels 20. In some embodiments, the extruding system 10 corresponds to several discharging channels 20. In some embodiments, the plurality of discharging channels 20 are connected to or communicable with the outlet 154 of the extruding system 10. In some embodiments, each of the discharging channels 20 is attached to the outlet 154 of the injection unit 150. The number of the discharging channels 20 may be adjusted according to the property of the mixture. The discharging channels 20 are extended parallel to each other and arranged adjacent to each other. In some embodiments, each discharging channel 20 may accommodate different amounts of the mixture injected from the outlet 154. The discharging channels 20 may discharge the same or different amount of the mixture into the molding device 30a. In some embodiments, each discharging channel 20 may operate under different temperatures. In some embodiments, the discharging channels 20 includes the first discharging channel 20a and a second discharging channel 20b communicable with the extruding system 10. The first discharging channel 20a and the second discharging channel 20b have widths same as or different from each other.

Each discharging channel 20 has an outlet 21 away from the injection unit 150. In some embodiments, the outlets 21 can have different widths or diameters, and thus the outlets 21 can have different flow rates of the mixture. In some embodiments, the outlets 21 can inject different amounts of the mixture. In some embodiments, the second discharging channel 20b includes a second outlet 21b configured to discharge the mixture from the extruding system 10 into at least one of the first mold cavity 31a and the second mold cavity 31b. Each of the discharging channel 20 may be moved, extended, or retracted synchronously or separately. In some embodiments, the outlet 21 of the corresponding discharging channel 20 may be extended into and be retracted from the molding device 30a.

The molding device 30a of the injection molding system 100 shown in FIG. 1 and the injection molding system 200 shown in FIG. 4 are described below. The number of the molding devices 30a may be adjusted according to requirements. In some embodiments, one molding device 30a corresponds to one discharging channel 20 as shown in FIG. 1. The mixture can be flowed from the extruding system 10 into one molding device 30a through one discharging channel 20. In some embodiments, one molding device 30a corresponds to a plurality of discharging channels 20 as shown in FIG. 4. The mixture can be flowed from the extruding system 10 into one molding device 30a through the plurality of the discharging channels 20. FIG. 4 illustrates two discharging channels 20 corresponding to the molding device 30a for clarity and simplicity, but such example is intended to be illustrative only, and is not intended to be limiting to the embodiments. A person ordinarily skilled in the art would readily understand that any suitable number of the discharging channels 20 may be utilized.

In some embodiments, referring to FIGS. 1 and 4, the molding device 30a includes a mold cavity 31 configured to receive the mixture and a feeding port 35 engagable with the outlet 21 and communicable with the mold cavity 31. The feeding port 35 is configure to dock the outlet 21. In some embodiments, the molding device 30a includes a first mold cavity 31a, a second mold cavity 31b separated from the first mold cavity 31a, a first feeding port 35a communicable with the first mold cavity 31a and engagable with the first outlet 21a, and a second feeding port 35b communicable with the second mold cavity 31b and engageable with the first outlet 21a. FIGS. 1 and 4 illustrates only two mold cavities 31a, 31b for clarity and simplicity, but such example is intended to be illustrative only, and is not intended to be limiting to the embodiments. A person ordinarily skilled in the art would readily understand that any suitable number of the mold cavities 31a, 31b may be utilized, and all such combinations are fully intended to be included within the scope of the embodiments. Additionally, the mold cavities 31a, 31b are illustrated as having similar features, this is intended to be illustrative and is not intended to limit the embodiments, as the mold cavities 31a, 31b may have similar structures or different structures in order to meet the desired functional capabilities.

In some embodiments, the molding device 30a includes an upper mold base 34 and a mold under the upper mold base 34. In some embodiments, the mold includes an upper mold 32 under the upper mold base 34, a lower mold 33 opposite to the upper mold 32, and a plurality of mold cavities 31 defined by the upper mold 32 and lower mold 33. In some embodiments, the plurality of the mold cavities 31 includes the first mold cavity 31a and the second mold cavity 31b.

In some embodiments, the first mold cavity 31a and the second mold cavity 31b is defined by the upper mold 32 and the lower mold 33. In some embodiments, the upper mold 32 and the lower mold 33 are complementary with and separable from each other. The lower mold 33 includes a plurality of lower mold cavities, and the upper mold 32 includes a plurality of upper mold cavities opposite to the lower mold cavities. In some embodiments, each of the mold cavity 31 is formed by one of the upper mold cavity and the corresponding lower mold cavity. Each of FIGS. 1 and 4 illustrate one mold includes two mold cavities 31 for clarity and simplicity, but such example is intended to be illustrative only, and is not intended to be limiting to the embodiments.

In some embodiments, each of the mold cavities 31 is defined by an inner top wall 311, an inner sidewall 312 and an inner bottom wall 313 opposite to the inner top wall 311. The inner top wall 311, the inner sidewall 312 and the inner bottom wall 313 defines the corresponding mold cavity 31. In some embodiments, each of the feeding ports 35 are in communication with the corresponding inner top walls 311.

In some embodiments, a first feeding port 35a is communicable with the first mold cavity 31a and engagable with the first outlet 21a. In some embodiments, at least one first feeding port 35a is communicable with the first mold cavity 31a. Each of the first feeding port 35a is communicable with the first mold cavity 31a and correspondingly engageable with the first outlet 21a. In some embodiments, the first feeding port 35a is disposed over the upper mold 32 or the lower mold 33 and is communicable with the first mold cavity 31a, the upper mold cavity or the lower mold cavity. FIG. 1 illustrates two first feeding ports 35a are included in one mold for clarity and simplicity, but such example is intended to be illustrative only, and is not intended to be limiting to the embodiments.

In some embodiments, at least one second feeding port 35b is communicable with the second mold cavity 31b. Each of the second feeding port 35b is communicable with the second mold cavity 31b and engageable with the first outlet 21a and/or the second outlet 21b. In some embodiments, the second feeding port 35b is disposed over the upper mold 32 or the lower mold 33 and is communicable with the second mold cavity 31b, the upper mold cavity or the lower mold cavity. FIGS. 1 and 4 illustrate one second feeding port 35b in one mold for clarity and simplicity, but such example is intended to be illustrative only, and is not intended to be limiting to the embodiments. A person ordinarily skilled in the art would readily understand that one mold may include one or more second feeding ports 35b communicable with the second mold cavity 31b.

In some embodiments, the discharging channels 20 are received by the upper mold base 34. In some embodiments, the first discharging channel 20a and the second discharging channel 20b are received by the upper mold base 34. In some embodiments, the first discharging channel 20a and the second discharging channel 20b are at least partially surrounded by the upper mold base 34. In some embodiments, the first feeding port 35a and the second feeding port 35b are configured to dock the first outlet 21a as shown in FIG. 1. In some embodiments, the first feeding port 35a and the second feeding port 35b are configured to dock the first outlet 21a and the second outlet 21b respectively as shown in FIG. 4. The mixture can be transported from the discharging channel 20 into the mold cavities 31 through the outlet 21 and the feeding port 35. In some embodiments, the mixture can be transported from the first discharging channel 20a into the first mold cavity 31a and the second mold cavity 31b through the first outlet 21a and the first feeding port 35a as shown in FIG. 1. In some embodiments, the mixture can be transported from the second discharging channel 20b into the second mold cavity 31b through the second outlet 21b and the second feeding port 35b as shown in FIG. 4. In some embodiments, the first feeding ports 35a and the second feeding port 35b can have different widths or diameters. In some embodiments, the first feeding ports 35a can have different widths or diameters. In some embodiments, the mixture is injected into the first mold cavity 31a and the second mold cavity 31b and then foamed polymeric articles are formed in the first mold cavity 31a and the second mold cavity 31b after a period of time.

In some embodiments, referring to FIGS. 1 and 4, the upper mold base 34 includes openings 341 configured to receive the discharging channel 20. Each of the openings 341 extends through the upper mold base 34. The upper mold base 34 may be mounted on the upper mold 32 by a screw, a clamp, a fastening means or the like. In some embodiments, the material of the upper mold base 34 is same as the material of the upper mold 32. In some embodiments, a width of the upper mold base 34 is greater than that of the upper mold 32 or the lower mold 33. In some embodiments, the number of openings 341 corresponds to the number of the mold cavities 31.

The pressure regulating system 36 coupled to the molding device 30a. The pressure regulating system 36 is configured to respectively regulate pressures inside the first mold cavity 31a and the second mold cavity 31b. In some embodiments, after the mixture is injected into the mold cavity 31, the pressure in the mold cavity 31 is increased, and the pressure regulating system 36 may vent some gas to ensure that the mold cavity 31 is kept within a suitable pressure range. In some embodiments, the pressure regulating system 36 is configured to adjust or reduce the pressure in the mold cavity 31.

In some embodiments, each of the mold cavities 31 is coupled to one or more pressure regulating systems 36. In some embodiments, each of the mold cavities 31 may include different numbers of the pressure regulating systems 36 or no pressure regulating system 36. In some embodiments, a first pressure regulating system 36a is coupled to the first mold cavity 31a and a second pressure regulating system 36b is coupled to the second mold cavity 31b. In some embodiments, the first mold cavity 31a and the second mold cavity 31b have different pressures.

In some embodiments, a junction point 37 is in connection with the corresponding mold cavity 31. In some embodiments, the inner sidewall 312 or the inner bottom wall 313 of the mold cavity 31 includes the junction point 37. In some embodiments, the junction point 37 is configured to allow a fluid or gas to enter into or exit from the corresponding mold cavity 31.

Each of the pressure regulating system 36 may include a first gas conduit 361, a second gas conduit 362, a gas source 363, a first valve 364, a second valve 365, and a pressure-sensing unit 366. In some embodiments, one end of the first gas conduit 361 is coupled to the corresponding inner sidewall 312 or the inner bottom wall 313 of the mold cavity 31. In some embodiments, one end of the first gas conduit 361 is coupled to the corresponding junction point 37, and the other end of the first gas conduit 361 is coupled to the corresponding gas source 363. In some embodiments, the gas source 363 is configured to supply a fluid or gas, in which a suitable fluid or gas may be supplied depending on the needs; for example, the fluid or gas may be air, inert gas, etc., but the present invention is not limited thereto.

The location, shape and number of the junction points 37 are not particularly limited, and may be adjusted depending on the needs. In some embodiments, each of the junction point 37 is a hole. In some embodiments, the junction point 37 is disposed at the corresponding inner sidewall 312 or the corresponding inner bottom wall 313 of the corresponding molding cavity 31 and penetrates the lower mold 33. In some embodiments, each of the junction point 37 is configured to supply gas and discharge gas, wherein when the first valve 364 is open and the corresponding second valve 365 is closed, the fluid or gas is supplied to the corresponding mold cavity 31; when the first valve 364 is closed and the corresponding second valve 365 is open, at least a portion of the fluid or gas in the corresponding mold cavity 31 is discharged.

In some embodiments, the first feeding ports 35a and second feeding port 35b are disposed at the inner top wall 311 or the inner sidewall 312 of the corresponding mold cavity 31. In some embodiments, the first feeding port 35a and the corresponding junction point 37 are disposed oppositely with respect to the first mold cavity 31a; as an example but not limitation, the first feeding port 35a is disposed at the inner top wall 311, and the junction point 37 is disposed at the inner bottom wall 313. In some embodiments, the first feeding ports 35a are disposed at the inner top wall 311, and the corresponding junction point 37 is disposed at the inner sidewall 312 of the first mold cavity 31a. In some embodiments, the first feeding port 35a is away from the corresponding junction point 37.

The first valve 364 is disposed at the corresponding first gas conduit 361 and is configured to control whether the gas from the gas source 363 enters the corresponding mold cavity 31 through the corresponding first gas conduit 361 and the corresponding junction point 37. The second gas conduit 362 coupled to the mold and in communication with the corresponding mold cavity 31. In some embodiments, the second gas conduit 362 is coupled to the corresponding junction point 37. The second valve 365 is disposed at the corresponding second gas conduit 362 and is configured to control whether the gas from the corresponding mold cavity 31 is discharged via the corresponding junction point 37 through the corresponding second gas conduit 362.

In some embodiments, the second gas conduit 362 is coupled to the corresponding first gas conduit 361 and the corresponding junction point 37. In some embodiments, one end of the second gas conduit 362 is in communication with a space with a pressure lower than the pressure in the corresponding mold cavity 31; for example, an external environment or a negative pressure space; however, the present invention is not limited thereto. The location at which the second gas conduit 362 connects with the corresponding first gas conduit 361 is not particularly limited; for example, the two may be connected at one end adjacent to an end where the first gas conduit 361 connects to the corresponding junction point 37. In some embodiments, the first valve 364 and the corresponding second valve 365 are not simultaneously open.

The pressure-sensing units 366 are configured to sense the pressure in the mold cavities 31. The pressure-sensing units 366 sense the pressures inside the first mold cavity 31a and the second mold cavity 31b.

In some embodiments, the properties of foamed polymers are affected by the pore size and distribution across the polymer, whereas the pore size and distribution are related to the temperature, pressure, and feeding rate. The pressure-sensing unit 366 is not limited to any particular type, as long as it can sense the pressure and provide pressure information after sensing the pressure in the corresponding mold cavity 31. The pressure regulating system 36 changes the condition at which the gas exits from/enters into the corresponding mold cavities 31 in accordance with the pressure information, so as to adjust the pressure in the corresponding mold cavity 31, in such a manner that the foamed polymeric article thus obtained has the desired predetermined shape and property.

In some embodiments, the pressure-sensing unit 366 is disposed in the corresponding mold cavity 31, the first gas conduit 361 or the second gas conduit 362. In some embodiments, the pressure-sensing unit 366 is disposed in the corresponding mold cavity 31 and is away from the corresponding feeding port 35. In some embodiments, each of the pressure regulating system 36 has a plurality of pressure-sensing units 366. The number and location of the plurality of pressure-sensing units 366 are not particularly limited, for example, they can be arranged at the inner sidewalls 312 of the mold cavities 31 and spaced from each other, and/or anywhere in the first gas conduits 361, and/or anywhere in the second gas conduits 362; however, the present invention is not limited thereto.

In some embodiments, each of the injection molding system 100 shown in FIG. 1 and the injection molding system 200 shown in FIG. 4 further includes a control system 60. The control system 60 is configured to control the extruding system 10, the discharging channel 20, and the molding devices 30a. In some embodiments, the control system 60 automatically controls the extruding system 10, the discharging channel 20, and the molding devices 30 in real time. In some embodiments, the control system 60 is communicable with the monitoring module 180 of the extruding system 10 in real time.

In some embodiments, the control system 60 includes a central processor 61 and a plurality of sensors 62 electrically connected to or communicable with the central processor 61. In some embodiments, the sensors 62 are placed throughout the injection molding system 100, 200 and configured to sense at least one processing condition (e.g., flow rate or viscosity of the mixture through the discharging channel 20, an amount of the mixture discharged from the discharging channel 20, a pressure inside the mold cavity 31, etc.) at a predetermined position of the injection molding system 100 (e.g., the sequence of extruding to the first mold cavity 31a and the second mold cavity 31b, the alignment of the discharging channel 20 to the first mold cavity 31a and the second mold cavity 31b, the first outlet 21a, the second outlet 21b, the first feeding port 35a, and the second feeding port 35b, etc.). For example, at least one sensor 62 is installed at the outlet 21 for sensing the processing condition at the outlet 21. In some embodiments, the sensor 62 is configured to detect the processing condition and transmit a signal or data based on the processing condition detected to the central processor 61 for further analysis.

In some embodiments, the control system 60 controls which of the first feeding port 35a and the second feeding port 35b the discharging channel 20 is docked to. In some embodiments, the cables 63 are electrically connected between the control system 60 and the extruding system 10, the discharging channel 20, and the molding device 30a. The cables 63 are configured to transmit the signal from the molding devices 30a to the extruding system 10 and the discharging channel 20.

In some embodiments, the control system 60 is configured to process the pressure information detected by the pressure-sensing units 366, and configured to adjust the mixing condition of the extruding system 10 and the extruding amount and timing of the discharging channel 20. In some embodiments, the pressure-sensing units 366 provide the pressure informations to the control system 60, and the control system 60 adjusts the first valve 364 and the second valve 365 in accordance with the pressure information. In some embodiments, the control system 60 adjusts the condition at which the gas enters into/exits from the mold cavities 31 in real time in accordance with the pressure information, and adjust the timing and amount of the mixture injected from the discharging channel 20 into the mold cavities 31, so that during the injection molding process, the amount and rate of injection is within a suitable or predetermined range, and the pressures in the mold cavities 31 are within suitable or predetermined pressure ranges at all times. In some embodiments, the control system 60 further controls the feeding condition of the first feeding port 35a and the second feeding port 35b and the gas supply condition of the corresponding gas sources 363. In some embodiments, the control system 60 and the first valves 364, the second valves 365, the pressure-sensing units 366 and the first feeding port 35a and the second feeding port 35b are electrically connected.

In some embodiments, the extruding system 10 and the discharging channel 20 are disposed over one of the plurality of mold cavities 31. In some embodiments, referring to FIG. 1, the first discharging channel 20a is horizontally and vertically movable relative to the first mold cavity 31a and the second mold cavity 31b. In some embodiments, the molding device 30a stationary. In some embodiments, the molding device 30a is movable relative to the extruding system 10 and the discharging channel 20. In some embodiments, the extruding system 10 and the discharging channel 20 are stationary. In some embodiments, referring to FIG. 4, the first discharging channel 20a is align with the first feeding port 35a, and the second discharging channel 20b is align with the second feeding port 35b. In some embodiments, the first discharging channel 20a and the second discharging channel 20b are vertically movable relative to the first mold cavity 31a and the second mold cavity 31b respectively.

Figure 5:
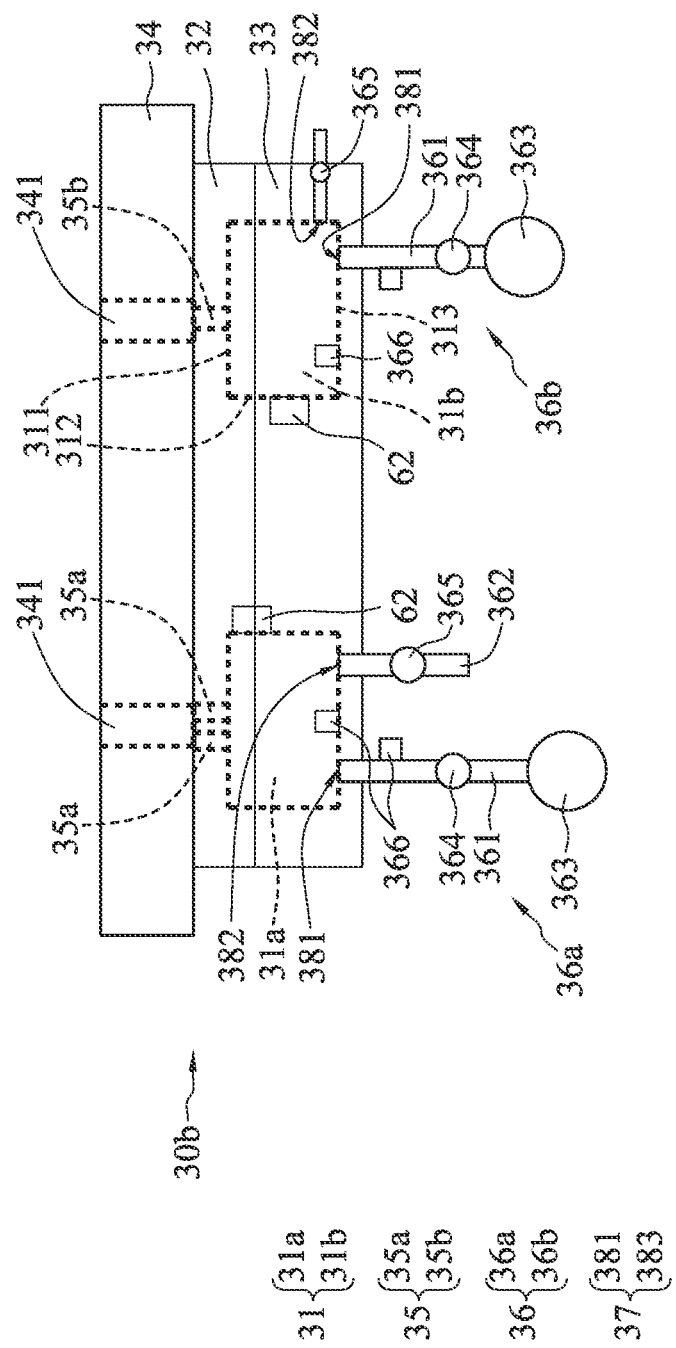
FIG. 5 is schematic diagram of a portion of an injection molding system according to one embodiment of the present invention.

In some embodiments, a molding device 30b shown in FIG. 5 is similar to the molding device 30a shown in FIGS. 1 and 4. In some embodiments, referring to FIG. 5, the first gas conduit 361 is separated from the corresponding second gas conduit 362, the second gas conduit 362 is coupled to the corresponding mold cavity 31. In some embodiments, the junction point 37 of the molding device 30b is a hole, which includes a first opening 381 and a second opening 382, wherein the first opening 381 is the connection with the first gas conduit 361, and the second opening 382 is the connection with the second gas conduit 362. In some embodiments, the first opening 381 is configured to intake gas, and the second opening 382 is configured to discharge gas. The locations of the first opening 381 and the second opening 382 are not particularly limited, as long as they are separated from each other. In some embodiments, the first opening 381 is away from the second opening 382. In some embodiments, the first opening 381 and the second opening 382 are disposed oppositely with respect to the corresponding feeding port 35. In some embodiments, the first opening 381 and the second opening 382 are disposed at the corresponding inner bottom wall 313 of the corresponding mold cavity 31. In some embodiments, the first opening 381 and the second opening 382 are disposed at the inner sidewall 312 of the corresponding mold cavity 31.

Figure 6:
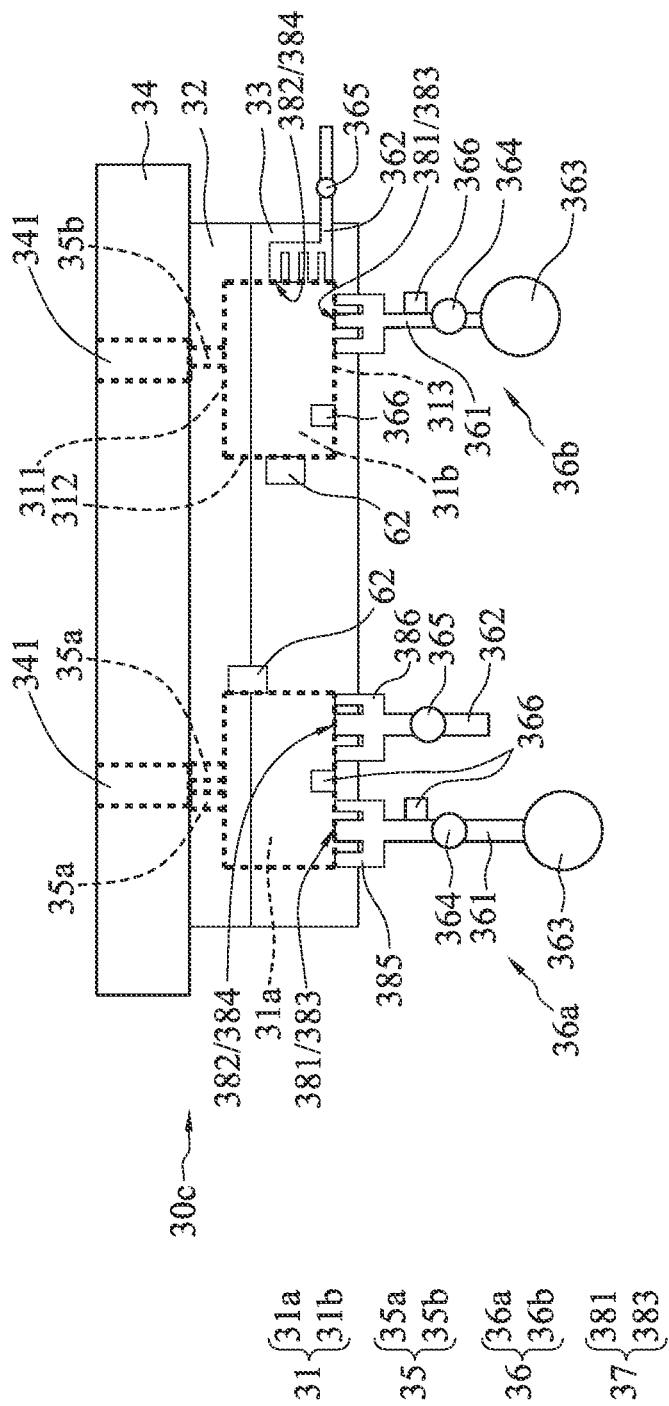
FIG. 6 is schematic diagram of a portion of an injection molding system according to one embodiment of the present invention.

In some embodiments, a molding device 30c shown in FIG. 6 is similar to the molding device 30b shown in FIG. 5. In some embodiments, referring to FIG. 6, the first opening 381 of the molding device 30c has a plurality of first pores 383, and the second opening 382 has a plurality of second pores 384. In some embodiments, the plurality of first pores 383 are respectively connected with the first gas conduit 361, whereas the plurality of second pores 384 are respectively connected with the second gas conduit 362. In some embodiments, the number of second pores 384 is greater than the number of the first pores 383. The locations of the plurality of first pores 383 and the plurality of second pores 384 are not particularly limited; they can be disposed alternately or at different regions in the mold cavity 31, respectively. In some embodiments, an end at which the first gas conduit 361 connects with the corresponding mold cavity 31 have a plurality of first guiding channels 385, wherein each first guiding channel 385 is connected to a corresponding first pore 383 and the first gas conduit 361. In some embodiments, an end at which the second gas conduit 362 connects with the corresponding mold cavity 31 has a plurality of second guiding channels 386, wherein each second guiding channel 386 is connected to a corresponding second pore 384 and the second gas conduit 362.

Figure 7:
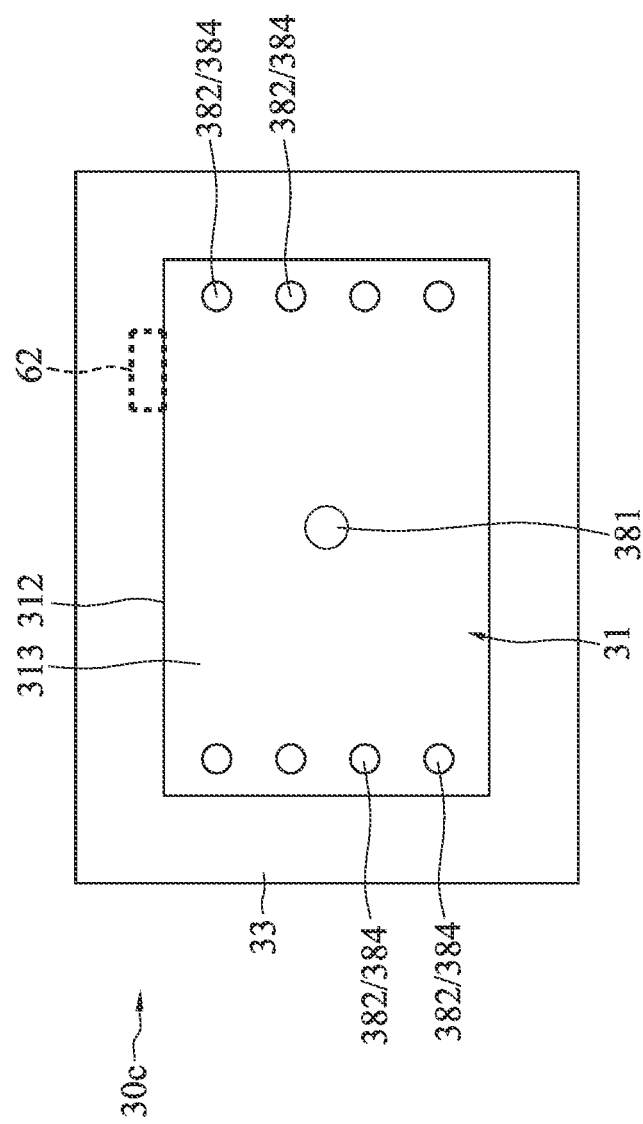
FIG. 7 is a top view illustrating a portion of an injection molding system according to one embodiment of the present invention.

In some embodiments, as shown in FIG. 7, the first opening 381 of the molding device 30c is disposed at middle of the mold cavity 31, and the second opening 382 is disposed at the periphery of the mold cavity 31. In some embodiments, the plurality of second pores 384 surrounds the first opening 381. In some embodiments, the first opening 381 and the plurality of second pores 384 are disposed at the inner bottom wall 313 of the mold cavity 31. In some embodiments, the diameter of each second pore 384 is smaller of the diameter of the first opening 381.

Figure 8:
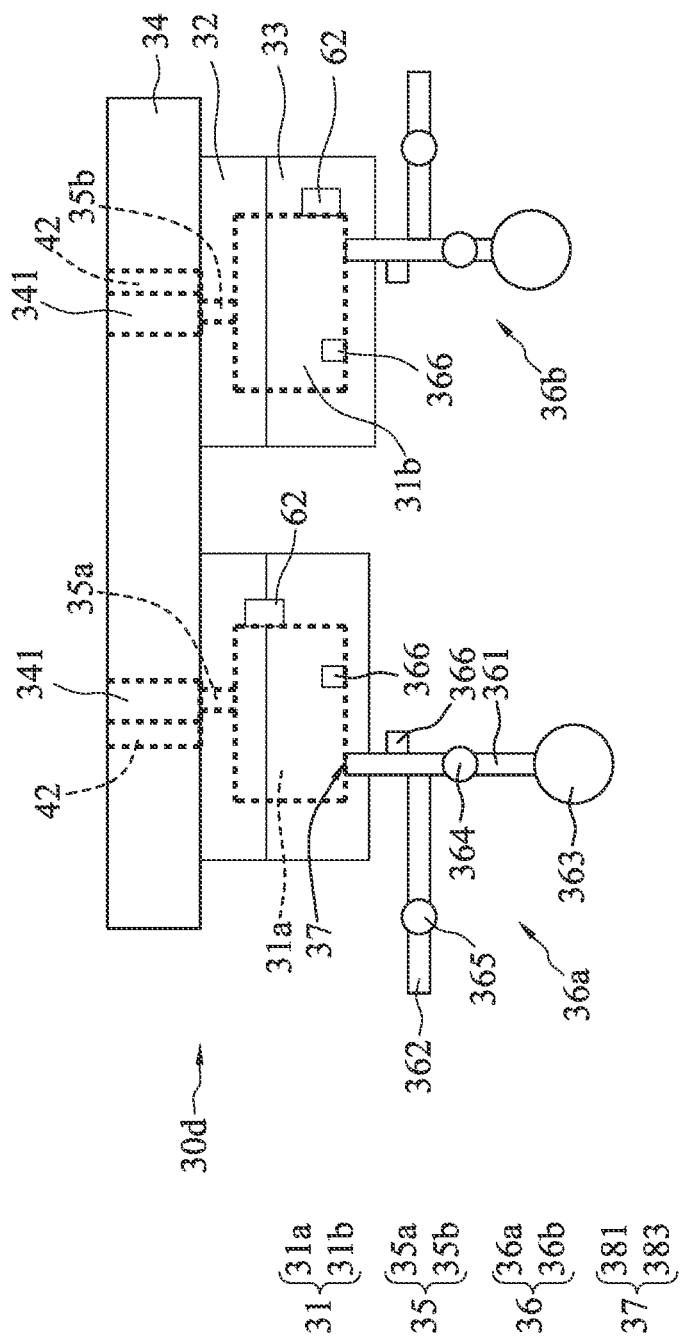
FIG. 8 is a schematic diagram of a portion of an injection molding system according to one embodiment of the present invention.

In some embodiments, referring to FIG. 8, a molding device 30d includes a plurality of molds disposed under the upper mold base 34. In some embodiments, the molding device 30d corresponds to two or more discharging channels 20. FIG. 8 illustrates the molding device 30d including two molds for clarity and simplicity, but such example is intended to be illustrative only, and is not intended to be limited to the embodiments. A person ordinarily skilled in the art would readily understand that suitable number of the molds can be utilized, and all such combinations are fully intended to be included within the scope of the embodiments.

In some embodiment, each mold receives the mixture at the same or different time. Each mold of the molding device 30d includes one mold cavity 31 defined therein. In some embodiments, the first mold cavity 31a is defined in one mold, and the second mold cavity 31b is defined by another mold. In some embodiments, the pressure regulating system 36 is coupled to the plurality of the molds to control the pressures of the inside the first mold cavity 31a and the second mold cavity 31b.

In some embodiments, referring back to FIGS. 1 and 4, the injection molding system further include a supporting device 40 configured to facilitate an engagement of the discharging channel 20 and the molding device 30a. The supporting device 40 configured to facilitate the engagement of the discharging channel 20 to the molding devices 30a can be disposed at any suitable position on the injection molding system 100, 200. In some embodiments, the supporting device 40 is configured to support the discharging channel 20. In some embodiments, the supporting device 40 is used to prevent separation of the discharging channel 20 and the first feeding port 35a or the second feeding port 35b during the injection of the mixture. In some embodiments, the control system 60 controls the supporting device 40 in real time. In some embodiments, the supporting device 40 may facilitate the engagement of the discharging channel 20 and the molding device 30b, 30c, 30d shown in FIGS. 5, 6 and 8.

Figure 9:
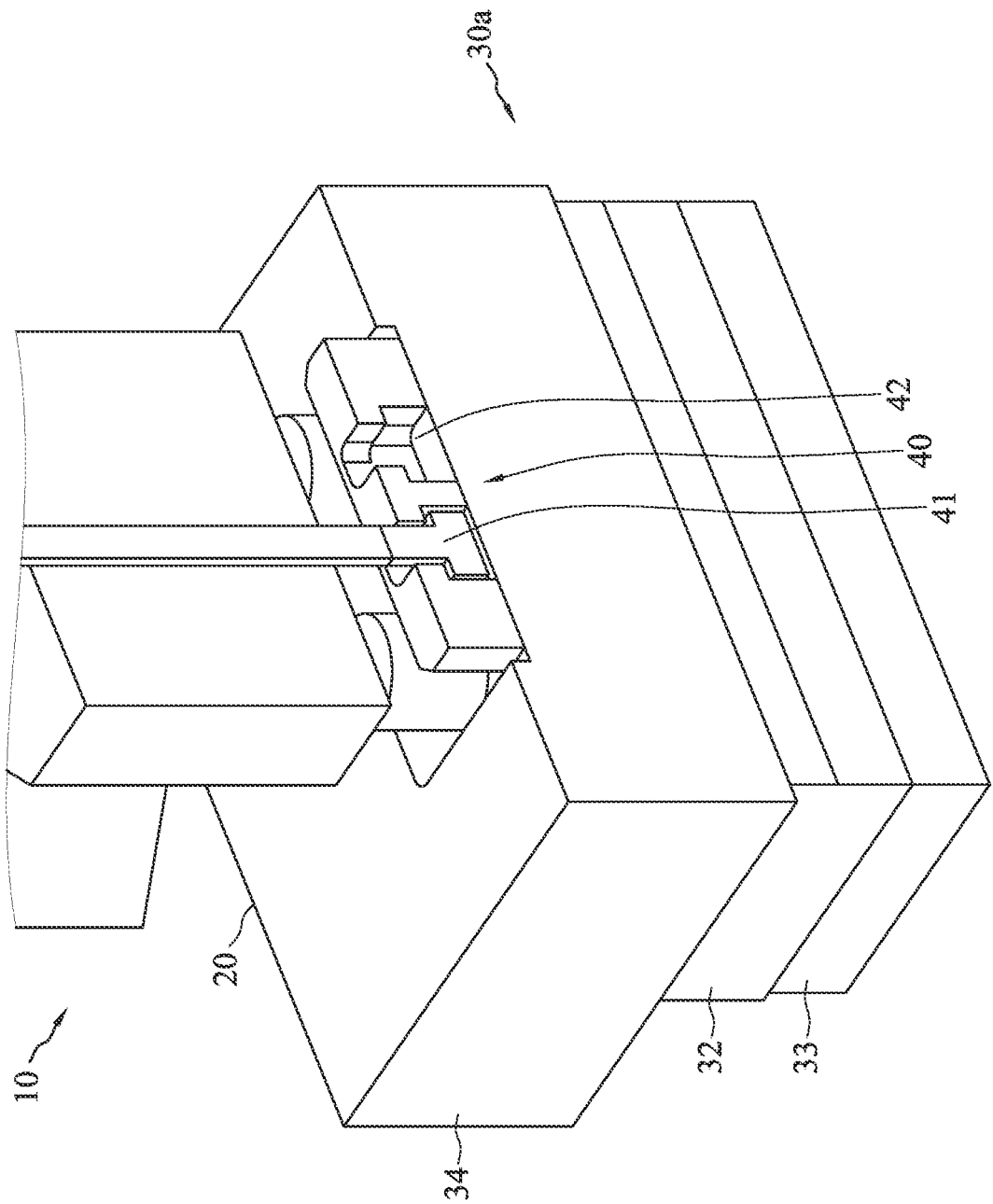
FIG. 9 is a schematic diagram of a portion of the injection molding system in FIG. 1 according to one embodiment of the present invention.

FIG. 9 is a schematic diagram of a portion of the injection molding system 100 according to one embodiment of the present disclosure. In some embodiments, referring to FIG. 9, the supporting device 40 includes first and second elements 41, 42 configured to engage with each other, wherein the first element 41 protrudes from the extruding system 10 or the discharging channel 20, and the second element 42 is disposed on the molding devices 30a, but the disclosure is not limited thereto. In some embodiments, the first and second elements, 41, 42 can be clamped to each other; for example, the second element 42 is configured to receive the first element 41.

In some embodiments, the supporting device 40 is disposed above the mold cavity 31 of the molding device 30a. In some embodiments, the first element 41 is disposed on the discharging channel 20, and the second element 42 is disposed on each molding devices 30a. In some embodiments, the second element 42 is disposed on the upper mold base 34 of the molding device 30a. In some embodiments, the first element 41 is a part of the extruding system 10 or the discharging channel 20, while the second element 42 is a part of the molding device 30a. In some embodiments, the first element 41 is a part of the extruding system 10 and disposed adjacent to the discharging channel 20, and the second element 42 is disposed above or facing toward the upper mold base 34 of the molding device 30a. In some embodiments, the first element 41 and the second element 42 can engage with each other, thereby tightly engaging the discharging channel 20 with the upper mold base 34 of the molding device 30a.

In some embodiments, the control system 60 further electrically controls the supporting device 40 of the molding devices 30a in real time. In some embodiments, the control system 60 controls the first element 41 to be connected to the molding device 30a, and controls the second element 42 to engage with the corresponding first element 41 for a predetermined temperature.

In some embodiments, in order to prevent separation of the extruding system 10 and the molding device 30a during the injection of the mixture, the engaged first element 41 is subjected to a force to against the second element 42. The force may be equal to or greater than a threshold. The threshold may be adjusted according to the pressure in the mold cavity 31 and the diameter of the outlet 21, or according to other factors.

The position and number of the first element 41 may be adjusted according to requirements, and are not particularly limited. The position and number of the second element 42 may also be adjusted according to requirements, and are not particularly limited. In some embodiments, the position and number of the second element 42 correspond to the position and number of the first element 41. In an embodiment, the first element 41 can be disposed at any suitable position on the discharging channel 20, and the second element 42 can be disposed at any suitable position on the molding device 30a. In some embodiments, the second element 42 is disposed above the upper mold 32.

Figure 10:
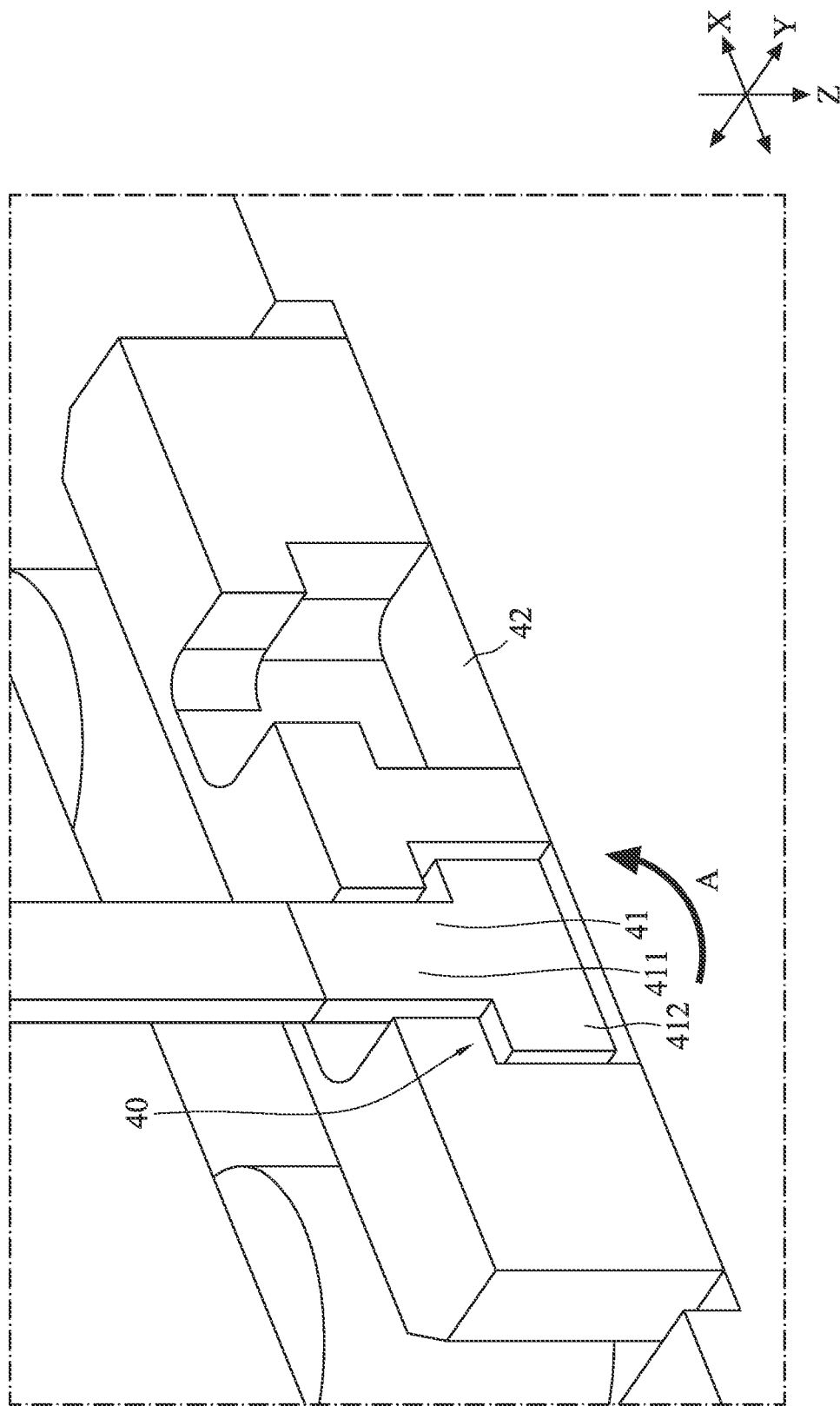
FIG. 10 is a schematic diagram of a portion of the injection molding system in FIG. 1 according to one embodiment of the present invention.

FIG. 10 is a schematic diagram of a portion of the injection molding system 100 according to one embodiment of the present invention. In some embodiments, referring to FIG. 10, the supporting device 40 can be in either of two states, a locked state and an unlocked state. In the unlocked state, the first element 41 enters the corresponding second element 42 but has not yet been locked with the second element 42. In other words, the first element 41 can still be withdrawn from the second element 42 when the supporting device 40 is in the unlocked state. In the locked state, the first element 41 enters and locks with the corresponding second element 42, such that the first element 41 cannot be withdrawn from the second element 42. FIG. 10 illustrates the supporting device 40 in the locked state. The supporting device 40 can be operated and controlled manually or automatically. The supporting device 40 can be switched between two states manually or automatically.

In some embodiments, the first element 41 is rotatably fixed to the extruding system 10. In some embodiments, the first element 41 includes an elongated portion 411 and an arm portion 412. The elongated portion 411 and the arm portion 412 are rotatable in a direction indicated by an arrow A. The elongated portion 411 is fixed to the extruding system 10 and extends in a first direction Z toward the upper mold 32. The arm portion 412 is coupled to the elongated portion 411 and extends in a second direction X substantially orthogonal to the first direction Z or in a third direction Y substantially orthogonal to the first direction Z. In some embodiments, the first element 41 has an inverted T shape. After the first element 41 enters the second element 42, the supporting device 40 is changed from the unlocked state to the locked state by rotation of the arm portion 412 of the first element 41. In some embodiments, the first element 41 is locked with the second element 42 by rotating the arm portion 412 of the first element 41 with about 90 degrees. FIG. 10 illustrates the arm portion 412 is locked with the second element 42 after rotating the arm portion 412 with about 90 degrees. As a result, the supporting device 40 is in the locked state, and the discharging channel 20 is tightly engaged with the molding device 30a, and thus the injection of the mixture from the extruding system 10 and the discharging channel 20 to the molding device 30a can begin.

In some embodiments, the temperature of the discharging channel 20 is different from the temperature of the molding device 30a. The temperature of the discharging channel 20 is greater than that of the molding device 30a. In some embodiments, temperature of the discharging channel 20 ranges between 150° C. and 200° C., and temperature of the molding device 30a may range between 20° C. and 60° C.

Figure 11A:
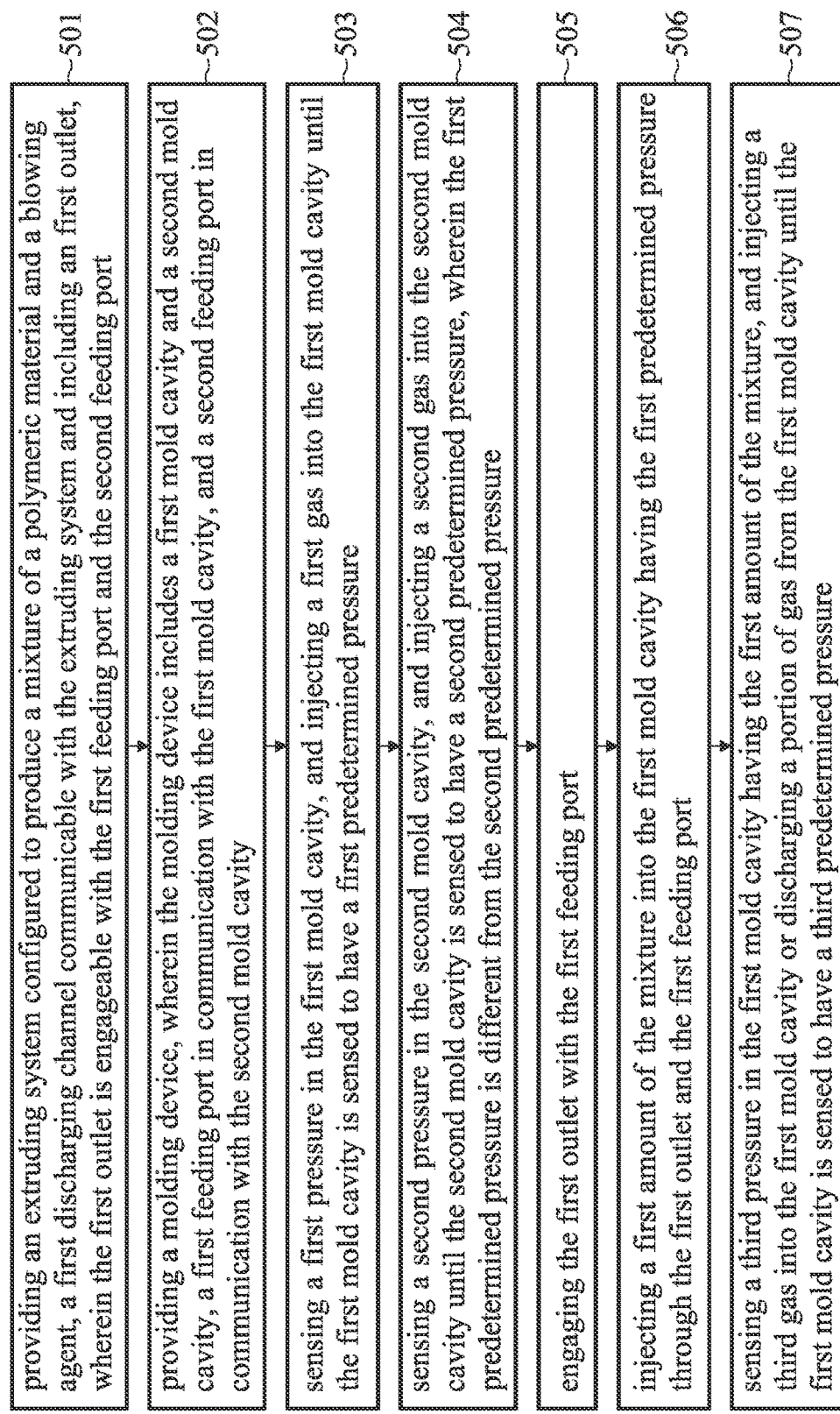

In the present disclosure, a method of injection molding is disclosed. In some embodiments, an injection molding is performed by the method. The method includes a number of operations and the description and illustrations are not deemed as a limitation of the sequence of the operations. FIG. 11A and FIG. 11B collectively illustrate a flowchart of a method 500 of injection molding according to one embodiment of the present invention. The method 500 is not limited to the above-mentioned embodiments. In some embodiments, the injection molding method 500 uses the above-mentioned injection molding system 100 as shown in FIG. 1.

Figure 12:
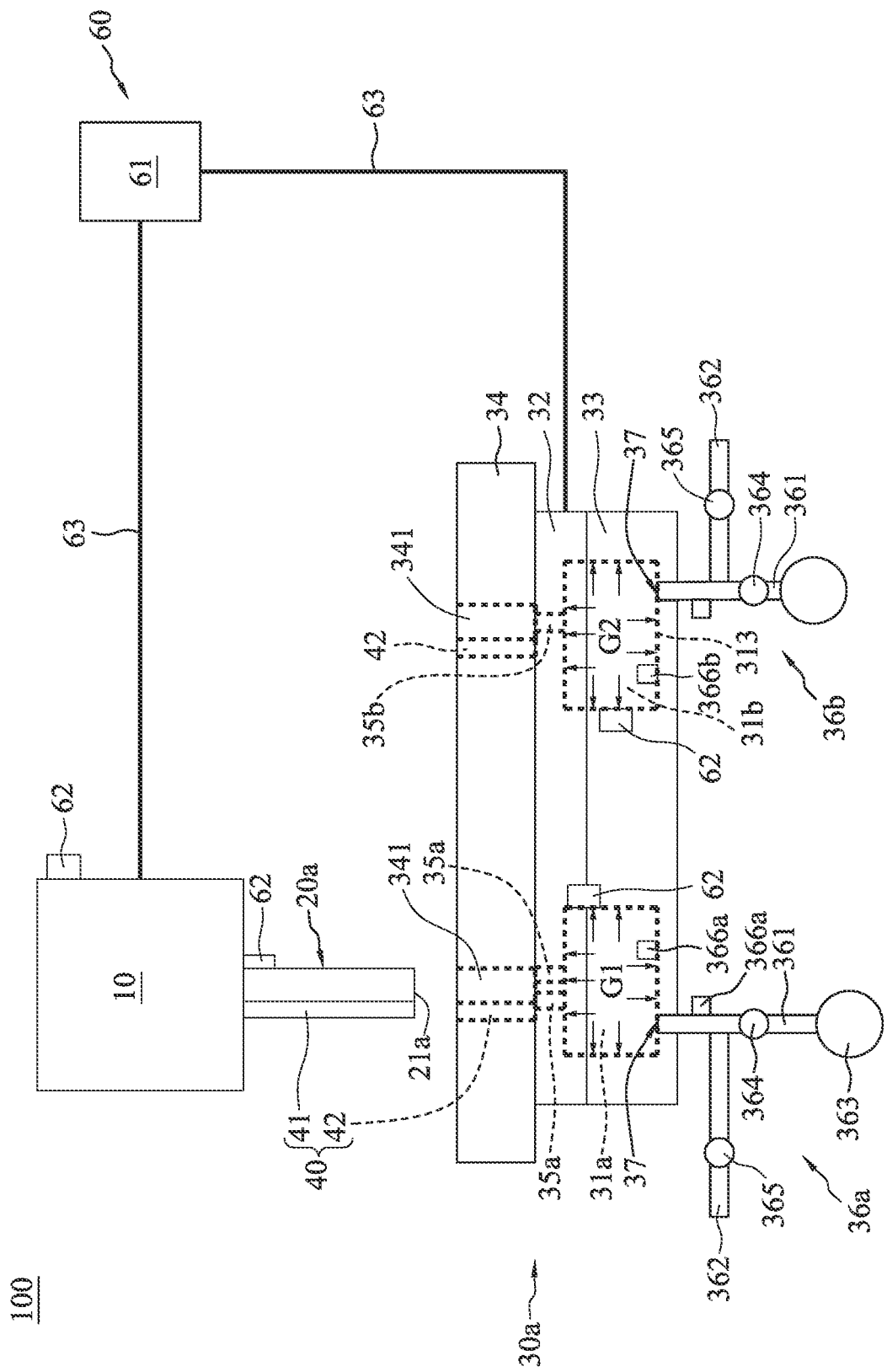
FIG. 12 to FIG. 19 are schematic diagrams illustrating exemplary operations for injection molding method according to one embodiment of the present disclosure.

In some embodiments, as shown in FIG. 12, the injection molding method 500 includes step 501, which includes providing an extruding system 10 configured to produce a mixture of a polymeric material and a blowing agent, a first discharging channel 20a communicable with the extruding system 10 and including an first outlet 21a, wherein the first outlet 21a is engageable with the first feeding port 35a and the second feeding port 35b. In some embodiments, the method 500 includes conveying the mixture from the extruding system 10 to the first discharging channel 20a. In some embodiments, the mixture is conveyed from the extruding system 10 to the first discharging channel 20a and accumulates in the first discharging channel 20a.

In some embodiments, the method 500 includes step 502, which includes providing a molding device 30a, wherein the molding device 30a includes a first mold cavity 31a and a second mold cavity 31b, a first feeding port 35a in communication with the first mold cavity 31a, and a second feeding port 35b in communication with the second mold cavity 31b. In some embodiments, two or more first feeding ports 35a are in communication with the first mold cavity 31a. In some embodiments, the molding device 30a is disposed under the extruding system 10, and the extruding system 10 is away from the molding device 30a.

In some embodiments, the method 500 includes step 503, which includes sensing a first pressure in the first mold cavity 31a, and injecting a first gas G1 into the first mold cavity 31a until the first mold cavity 31a is sensed to have a first predetermined pressure. In some embodiments, a first pressure sensing unit 366a of a first pressure regulating system 36a senses the first pressure of the first mold cavity 31a. In some embodiments, the first gas G1 is injected into the first mold cavity 31a through the first pressure regulating system 36a in connection with the first mold cavity 31a. In some embodiments, the first gas G1 injected into the first mold cavity 31a through a first gas conduit 361 of the first pressure regulating system 36a. In some embodiments, the first gas G1 is any suitable gas depending on the need; for example, air; however, the present invention is not limited thereto.

In some embodiments, a first valve 364 of the first pressure regulating system 36a is opened so that the first gas G1 is injected into the first mold cavity 31a through the first gas conduit 361. In some embodiments, the first gas G1 is injected into the first mold cavity 31a through the first pressure regulating system 36a when the first feeding port 35a is closed. In some embodiments, the first gas G1 is injected into the first mold cavity 31a through the first feeding port 35a.

In some embodiments, during the process of injecting the first gas G1 into the first mold cavity 31a, the pressure in the first mold cavity 31a is sensed continuously. In some embodiments, the first pressure sensing unit 366a continuously senses the first pressure in the first mold cavity 31a, and the first gas G1 is injected into the first mold cavity 31a until it is senses that the first mold cavity 31a has the first predetermined pressure; then, the first valve 364 and the second valve 365 of the first pressure regulating system 36a are closed, and the first gas G1 injection into the first mold cavity 31a is stopped. In some embodiments, the first predetermined pressure is greater than the atmospheric pressure. In some embodiments, the first predetermined pressure is less than the atmospheric pressure.

In some embodiments, the method 500 includes step 504, which includes sensing a second pressure in the second mold cavity 31b, and injecting a second gas G2 into the second mold cavity 31b until the second mold cavity 31b is sensed to have a second predetermined pressure. In some embodiments, the second gas G2 is injected into the second mold cavity 31b through a second pressure regulating system 36b in connection with the second mold cavity 31b. In some embodiments, the second gas G2 injected into the second mold cavity 31b through a first gas conduit 361 of the second pressure regulating system 36b. In some embodiments, the injection of the first gas G1 and the injection of the second gas G2 are performed simultaneously or separately In some embodiments, a first valve 364 of the second pressure regulating system 36b is opened so that the second gas G2 is injected into the second mold cavity 31b through the first gas conduit 361 of the second pressure regulating system 36b. In some embodiments, the second gas G2 is injected into the second mold cavity 31b through the second pressure regulating system 36b when the second feeding port 35b is closed. In some embodiments, the second gas G2 is injected into the second mold cavity 31b through the second feeding port 35b.

In some embodiments, during the process of injecting the second gas G2 into the second mold cavity 31b, the pressure in the second mold cavity 31b is sensed continuously. In some embodiments, the second pressure sensing unit 366b continuously senses the second pressure in the second mold cavity 31b, and the second gas G2 is injected into the second mold cavity 31b until it is senses that the second mold cavity 31b has the second predetermined pressure; then, the first valve 364 and the second valve 365 of the second pressure regulating system 36b, and the second gas G2 injection into the second mold cavity 31b is stopped. In some embodiments, the second predetermined pressure is greater than the atmospheric pressure. In some embodiments, the second predetermined pressure is less than the atmospheric pressure.

In some embodiments, the first predetermined pressure is different from the second predetermined pressure. In some embodiments, the first pressure and the second pressure are sensed in real time, and a control system 60 electrically connected to the molding device 30a controls the first pressure and the second pressure in real time.

Figure 13:
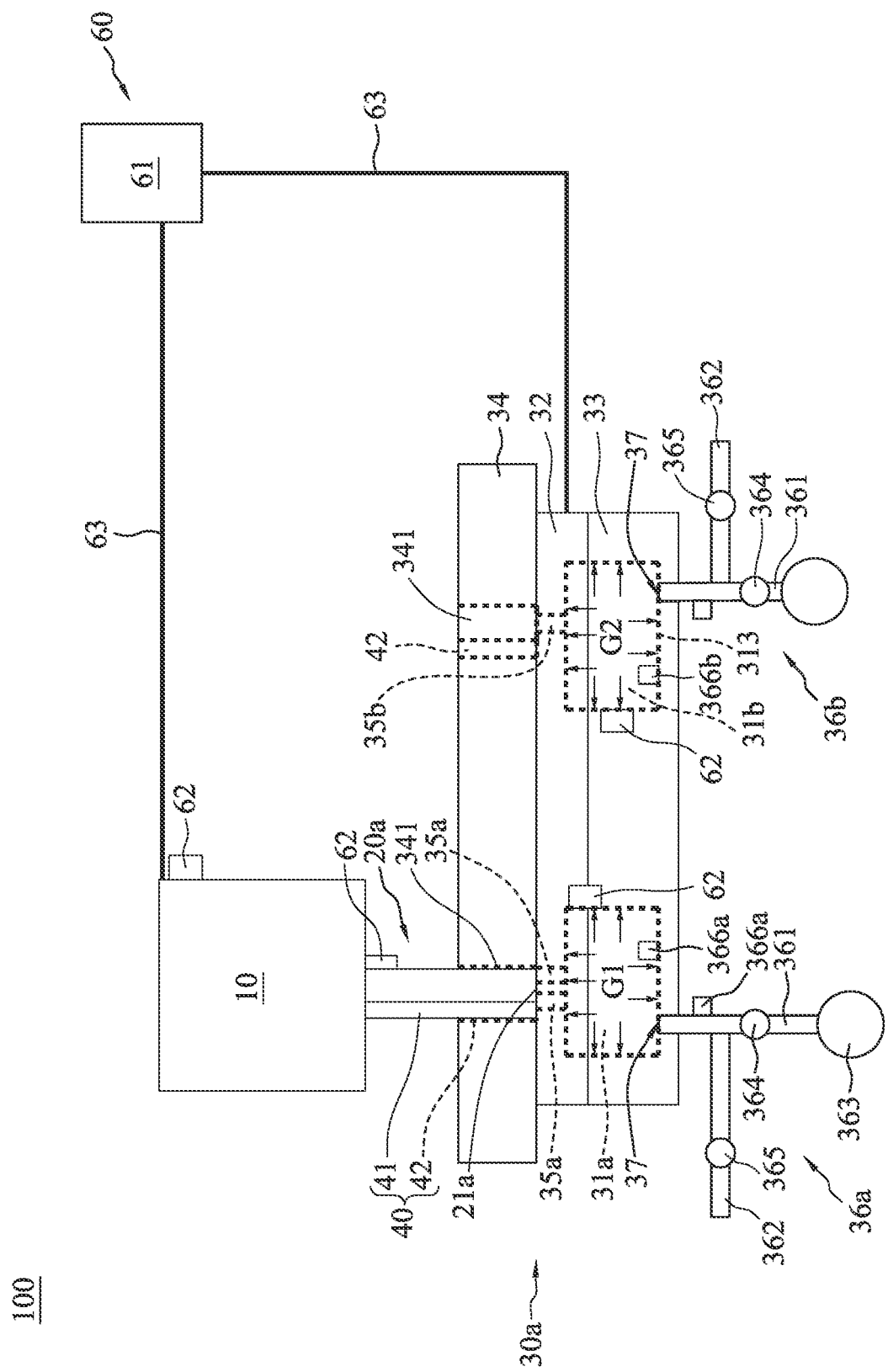

In some embodiments, referring to FIG. 13, the method 500 includes step 505, which includes engaging the first outlet 21a with the first feeding port 35a. In some embodiments, after the engagement of the first outlet 21a and the first feeding port 35a, the pressure in the first mold cavity 31a of the molding device 30a is adjusted to the first predetermined pressure.

In some embodiments, before the engagement of the first outlet 21a with the first feeding port 35a of the first molding device 30a, the first discharging channel 20 is moved to a first position above the first molding device 30a. In some embodiments, the first discharging channel 20a is moved horizontally to the first position above the first molding device 30a. At the first position, the first discharging channels 20a is aligned with the corresponding openings 341 of the upper mold base 34 of the molding device 30a. In some embodiments, a distance between the first outlet 21 and the upper surface of the upper mold base 34 is greater than 0.

In some embodiments, after the vertical alignment of the first discharging channel 20a with the corresponding openings 341, the first discharging channel 20a is moved toward the first mold cavity 31a to be received by the corresponding openings 341 of the upper mold base 34, and then the first outlet 21a is docked to the first feeding port 35a. In some embodiments, the first discharging channel 20a is moved vertically toward the first mold cavity 31a to be received by the corresponding openings 341 of the upper mold base 34.

After the first outlet 21a is docked to the first feeding port 35a, the first outlet 21a and the first feeding port 35a form a flow path of the mixture, such that the first discharging channel 20a is communicable with the first mold cavity 31a through the first feeding port 35a. Is some embodiments, the flow path is formed by the two or more first feeding ports 35a and the first outlet 21a. The first outlet 21 must be tightly engaged with the first feeding port 35 in order to prevent the mixture from leaking out of the molding device 30a.

Figure 14:
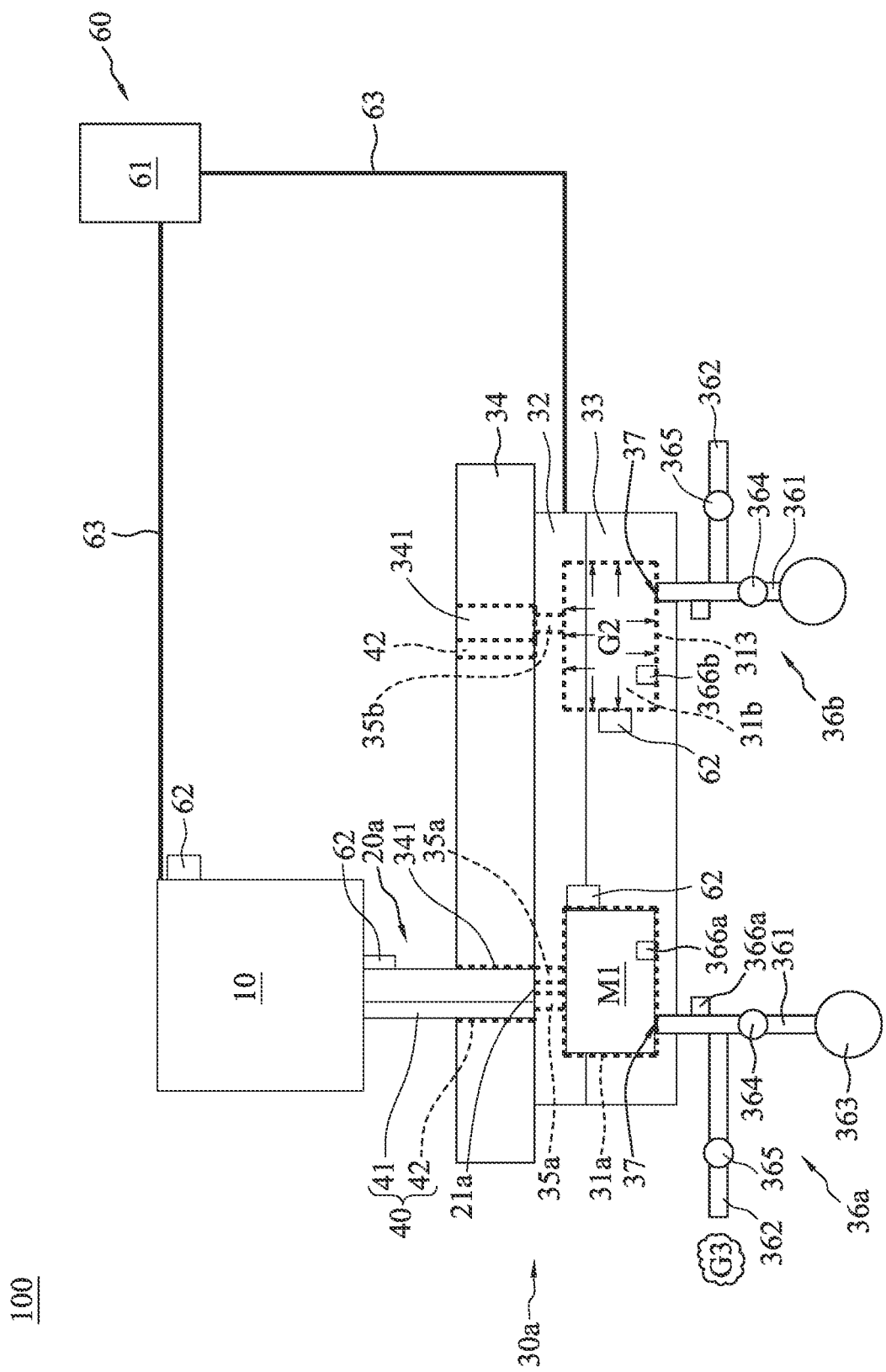

In some embodiments, the method 500 includes step 506, which includes injecting a first amount M1 of the mixture into the first mold cavity 31a having the first predetermined pressure through the first outlet 21a and the first feeding port 35a. Referring to FIG. 14, in some embodiments, after the first mold cavity 31a has the first predetermined pressure, the injection of the first amount M1 of the mixture begins. In some embodiments, the first mold cavity 31a has the first predetermined pressure before step 506, and the first valve 364 and the second valve 365 of the first pressure regulating system 36a are closed. In some embodiments, in step 506, the first amount of the mixture M1 is injected from the first discharging channel 20a into the first mold cavity 31a through the first outlet 21a and the first feeding port 35a. In some embodiments, the first discharging channel 20a is at least partially surrounded by the molding device 30a upon the injection of the first amount of the mixture M1.

In some embodiments, step 506 further includes securing the first discharging channel 20a to the molding device 30a to dock the first outlet 21a to the first feeding port 35a. In some embodiments, a force is provided by a supporting device 40 to prevent the separation of the extruding system 10 from the molding device 30a. In some embodiments, in step 506, when the mixture is injected from the extruding system 10 into the molding device 30a, the molding device 30a may generate a reaction force opposite to an injection direction, and the reaction force may be transmitted to the first discharging channel 20a and the extruding system 10, so that the first discharging channel 20a tend to separate from the molding device 30a. In some embodiments, the supporting device 40 provides support against the reaction force opposite to the injection direction.

In some embodiments, the first discharging channel 20a is secured to the molding device 30a by engaging a first element 41 of the supporting device 40 relative to a second element 42 of the supporting device 40 to secure the first discharging channel 20a with the molding device 30a, wherein the first element 41 protrudes from the extruding system 10, and the second element 42 is disposed on the molding device 30a. In some embodiments, a force is provided by the supporting device 40 after the engagement to prevent the first discharging channel 20a separating from the molding device 30a.

In some embodiments, the first discharging channel 20a is secured to the molding device 30a by turning the supporting device 40 into the lock state, such as rotating the first element 41 of the supporting device 40 relative to and within the second element 42 of the supporting device 40 while engaging the first outlet 21a with the first feeding port 35a. In some embodiments, when the first outlet 21a is docked to the first feeding ports 35a, the first element 41 enters the second element 42 and then locked with the second element 42. In some embodiments, the first discharging channel 20a is secured to the molding device 30a by rotating an elongated portion 411 and an arm portion 412 of the first element 41 of the supporting device 40, the elongated portion 411 is fixed to the extruding system 10 and extends in a first direction Z toward the molding device 30a, and the arm portion 412 is coupled to the elongated portion 411 and extends in a second direction X different from the first direction Z.

In some embodiments, in step 506, during the process of injecting the first amount of the mixture M1 into the first mold cavity 31a of the molding device 30a, the pressure in the first mold cavity 31a changes rapidly, and the first pressure-sensing unit 366a continuously senses the first pressure in the first mold cavity 31a. In some embodiments, the first amount of the mixture M1 is injected into the first mold cavity 31a of the molding device 30a from the first feeding port 35a, and the first predetermined pressure applies to the first amount of the mixture M1. In some embodiments, the first amount of the mixture M1 and the first gas G1 are disposed in the first mold cavity 31a, and the first amount of the mixture M1 will expand and foam in the first mold cavity 31a.

In some embodiments, the process of injecting the first amount of the mixture M1 into the first mold cavity 31a having the first predetermined pressure lasts for less than 1 second. In some embodiments, due to the first mold cavity 31a has the first predetermined pressure, the completion of the filling the first amount of the mixture M1 may be last for less than 0.5 second. During the injecting period or at the moment of the completion of the injection, the pressure in the first mold cavity 31a is sensed by the first pressure-sensing unit 366a in real time, and the pressure information is provided, so that the first pressure regulating system 36a can adjust the pressure in the first mold cavity 31a in accordance with the pressure information, and hence, the pressure in the first mold cavity 31a can be kept within the predetermined pressure range.

In some embodiments, when the first pressure of the first mold cavity 31a is sensed to be greater than the first predetermined pressure, the portion of the gas in the first mold cavity 31a is discharged from the first mold cavity 31a. In some embodiments, the first amount of the mixture M1 is injected into the first mold cavity 31a of the molding device 30a from the first feeding port 35a, and thereby increasing the first pressure to a third pressure in the first mold cavity 31a having the first amount of the mixture M1. In some embodiments, the third pressure in the first mold cavity 31a having the first amount of the mixture M1 is greater than the first predetermined pressure. In some embodiments, the pressure in the first mold cavity 31a of the molding device 30a is raised from the first predetermined pressure to the third pressure.

In some embodiments, still referring to FIG. 14, the method 500 includes step 507, which includes sensing the third pressure in the first mold cavity 31a having the first amount of the mixture M1, and injecting a third gas into the first mold cavity or discharging a portion of gas G3 from the first mold cavity 31a until the first mold cavity 31a is sensed to have a third predetermined pressure.

In some embodiments, after the first amount of the mixture M1 is injected into the first mold cavity 31a having the first predetermined pressure, the pressure in the first mold cavity 31a increases, and therefore, the setting of the third predetermined pressure ensures that the first mold cavity 31a is maintained within a suitable pressure range. In some embodiments, when the first mold cavity 31a reaches the third predetermined pressure, the injection of the third gas into the first mold cavity 31a or discharging a portion of gas G3 from the first mold cavity 31a is stopped.

In some embodiments, in step 507, a portion of gas G3 is discharged from the first mold cavity 31a after injecting the third gas into the first mold cavity 31a. In some embodiments, step 507 further includes foaming the first amount of the mixture M1 in the first mold cavity 31a, and discharging the gas G3 in less than 1 second from the first mold cavity 31a through the first pressure regulating system 36a while the first amount of the mixture M1 is foaming in the first mold cavity 31a. Due to the discharging of the gas G3, the first amount of the mixture M1 in the first mold cavity 31a after the foaming process may have a lower density. In some embodiments, the gas G3 is discharged from the first mold cavity 31a through the junction point 37 of the first pressure regulating system 36a. In some embodiments, the gas G3 is discharged from the first mold cavity 31a during or after the foaming process of the first amount of the mixture M1 in the first mold cavity 31a. In some embodiments, the third pressure in the first mold cavity 31a is decreased to the third predetermined pressure.

In some embodiments, when the first pressure-sensing unit 366a senses that the third pressure in the first mold cavity 31a is greater than the third predetermined pressure, the gas G3 in the first mold cavity 31a is discharged until the pressure in the first mold cavity 31a is within a predetermined pressure range. In some embodiments, the predetermined pressure range is between the first predetermined pressure and the third predetermined pressure. In some embodiments, the second valve 365 is open and the gas G3 in the first mold cavity 31a is discharged through the second gas conduit 362 of the first pressure regulating system 36a.

Figure 15:
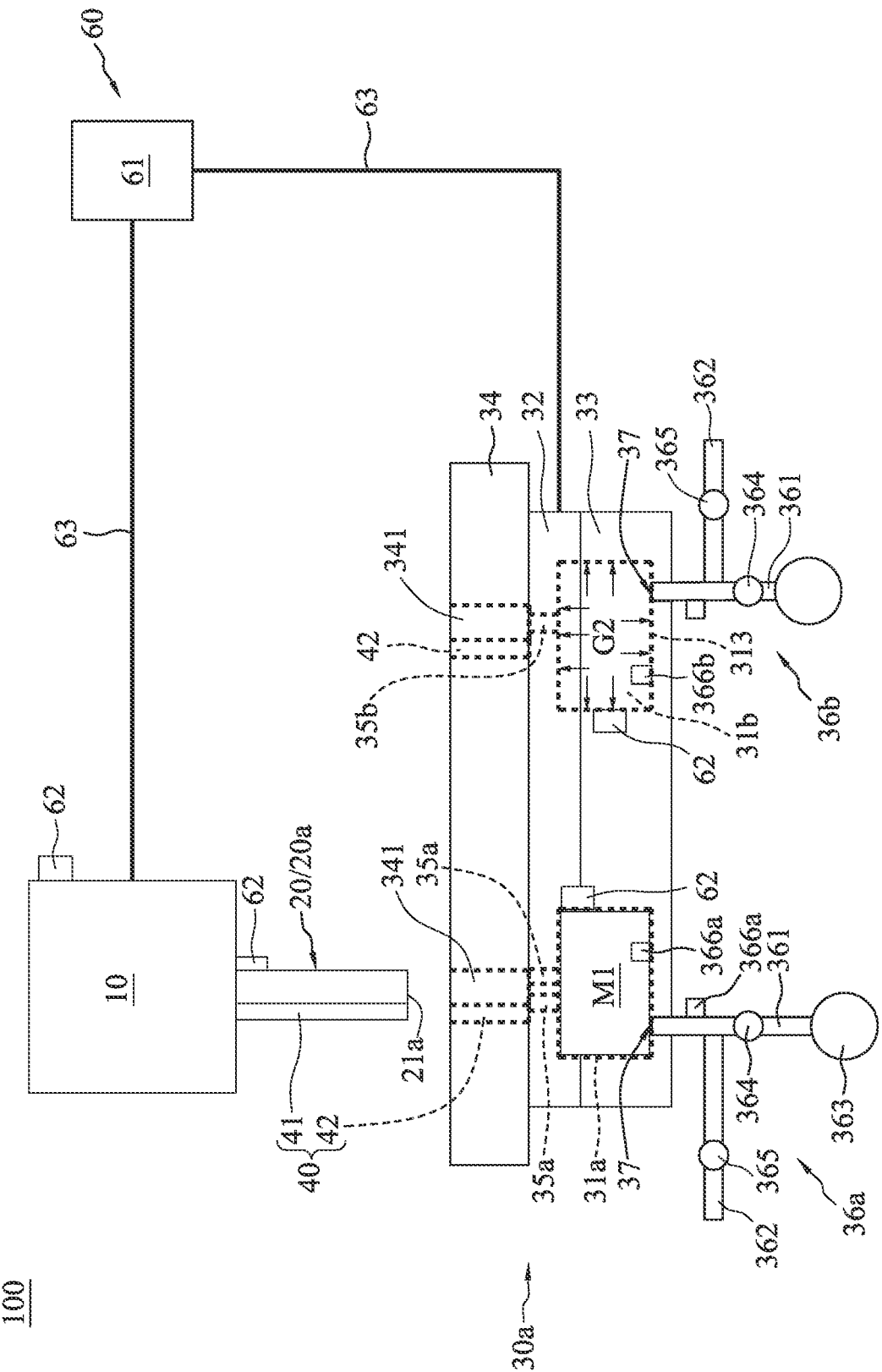

In some embodiments, referring to FIG. 15, the method 500 includes step 508, which includes disengaging the first outlet 21a from the first feeding port 35a of the molding device 30a. In some embodiments, after the injection of the first amount of the mixture M1 into the first mold cavity 31a, the first discharging channel 20a is disengaged from and moved away from the molding device 30a.

In some embodiments, before the disengaging of the first outlet 21a from the first feeding port 35a, the supporting device 40 is shifted into the unlocked state. In some embodiments, the supporting device 40 is changed from locked state to unlocked state by rotating a first element 41 of the supporting device 40 relative to and within a second element 42 of the supporting device 40 to unlock the discharging channel 20 from the molding device 30a. In some embodiments, during the disengagement of the first outlet 21a from the first feeding port 35a, the first element 41 is unlocked from the second element 42 and is then pulled away from the second element 42.

Figure 16:
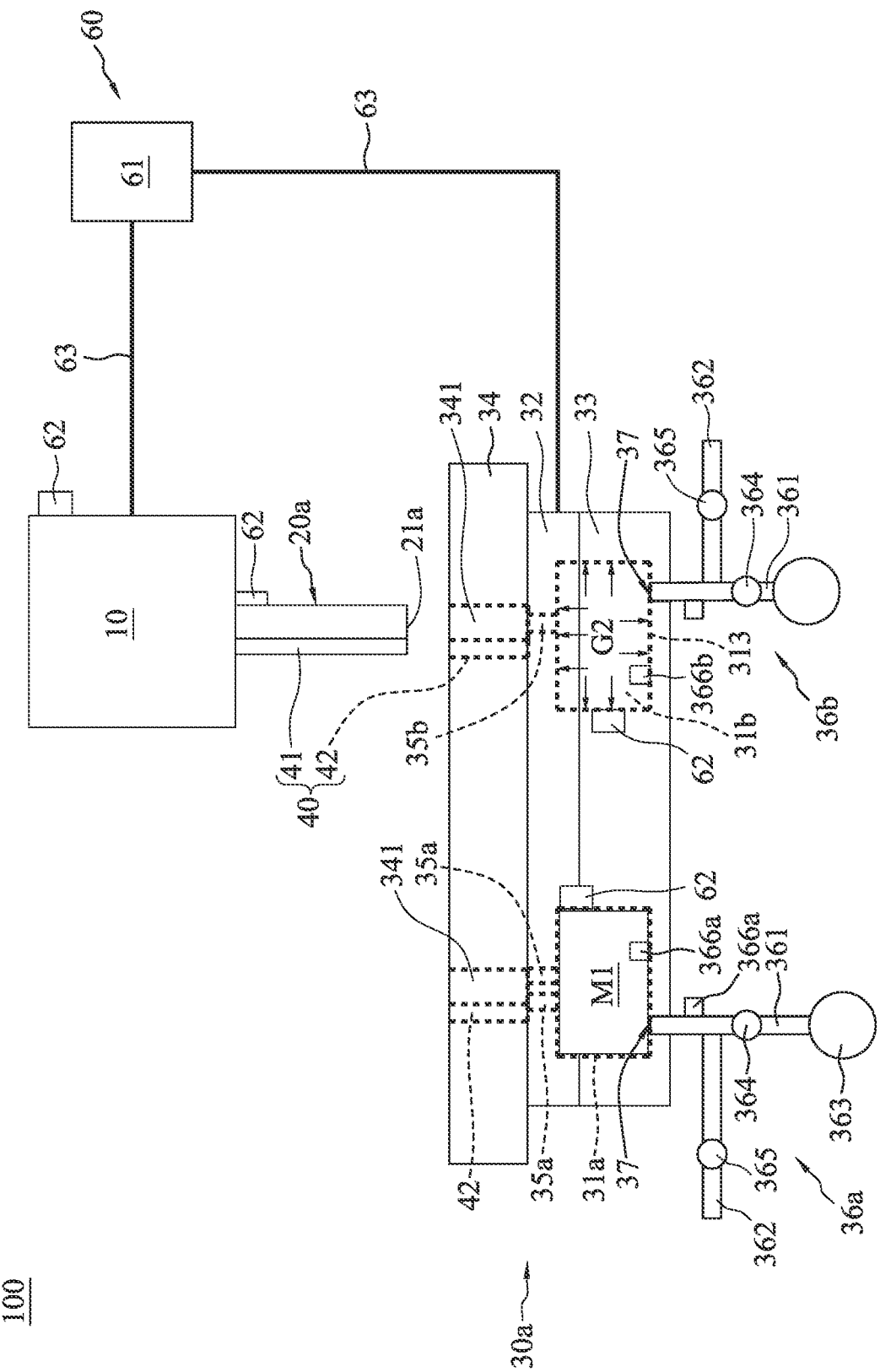

In some embodiments, referring to FIG. 16, the method 500 includes step 509, which includes moving the first discharging channel 20a away from the first mold cavity 31a and toward the second mold cavity 31b. In some embodiments, the movement of the first discharging channel 20 includes moving the first discharging channel 20 from the first position above the first mold cavity 31a to a second position above the second mold cavity 31b. In some embodiments, the first discharging channel 20a are moved vertically away from the first mold cavity 31a, and then moved horizontally to the second position above the second mold cavity 31b.

In some embodiments, the setting and arrangement of the second mold cavity 31b is similar to the setting and arrangement of the first mold cavity 31a, and a detailed description thereof is omitted here for the sake of brevity.

Figure 17:
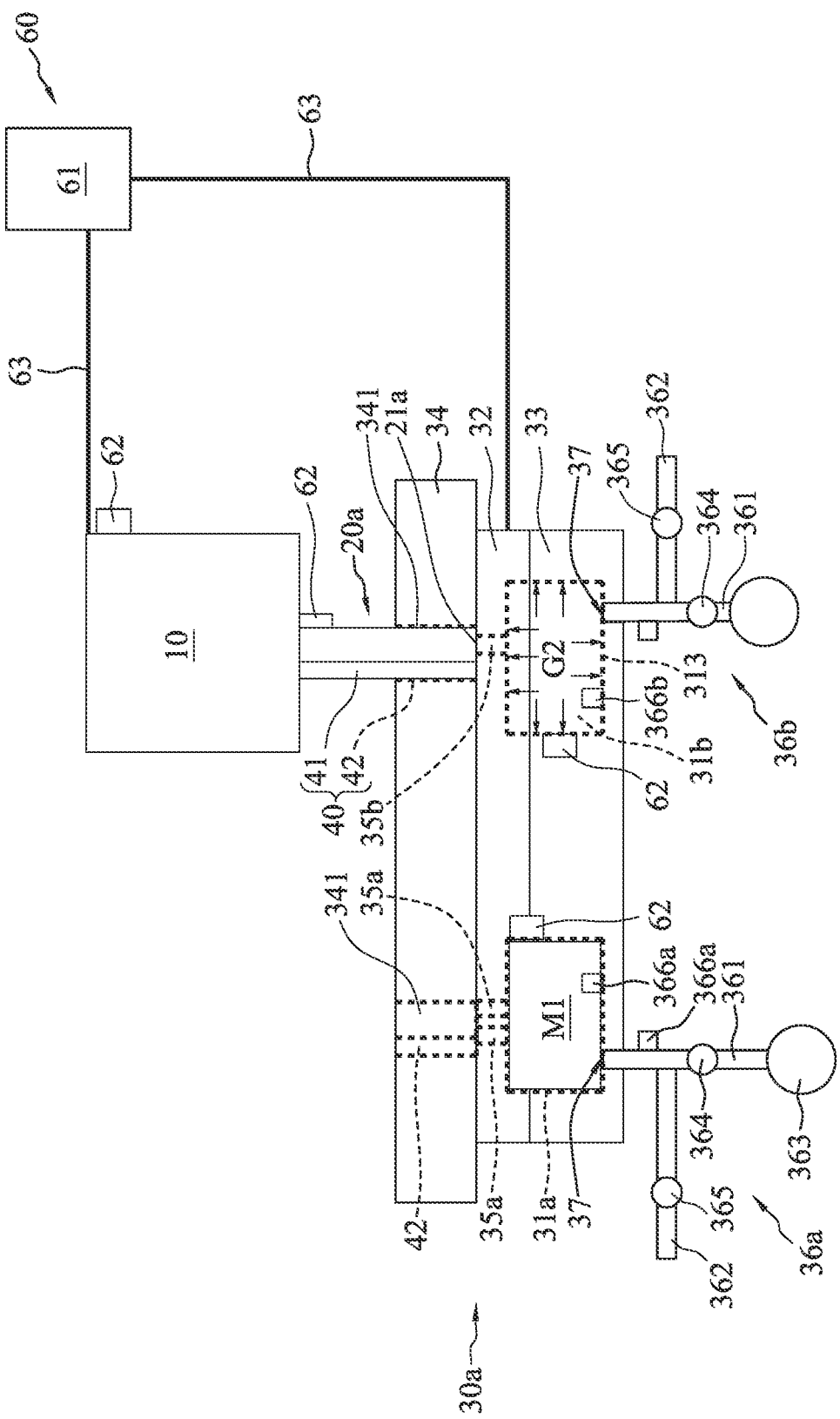

In some embodiments, referring to FIG. 17, the method 500 includes step 510, which includes engaging the first outlet 21a with the second feeding port 35b. In some embodiments, the first discharging channel 20a is moved toward the second mold cavity 31b to be received by the corresponding openings 341 of the upper mold base 34, and then the first outlet 21a is docked to the second feeding port 35b. In some embodiments, the method 500 further includes securing the first discharging channel 20a to the molding device 30a to dock the first outlet 21a to the second feeding port 35b. In some embodiments, the process of securing the first discharging channel 20a to the second feeding port 35b is similar to the process of securing the first discharging channel 20a to the first feeding port 35a in step 506, and a detailed description thereof is omitted here for the sake of brevity.

Figure 18:
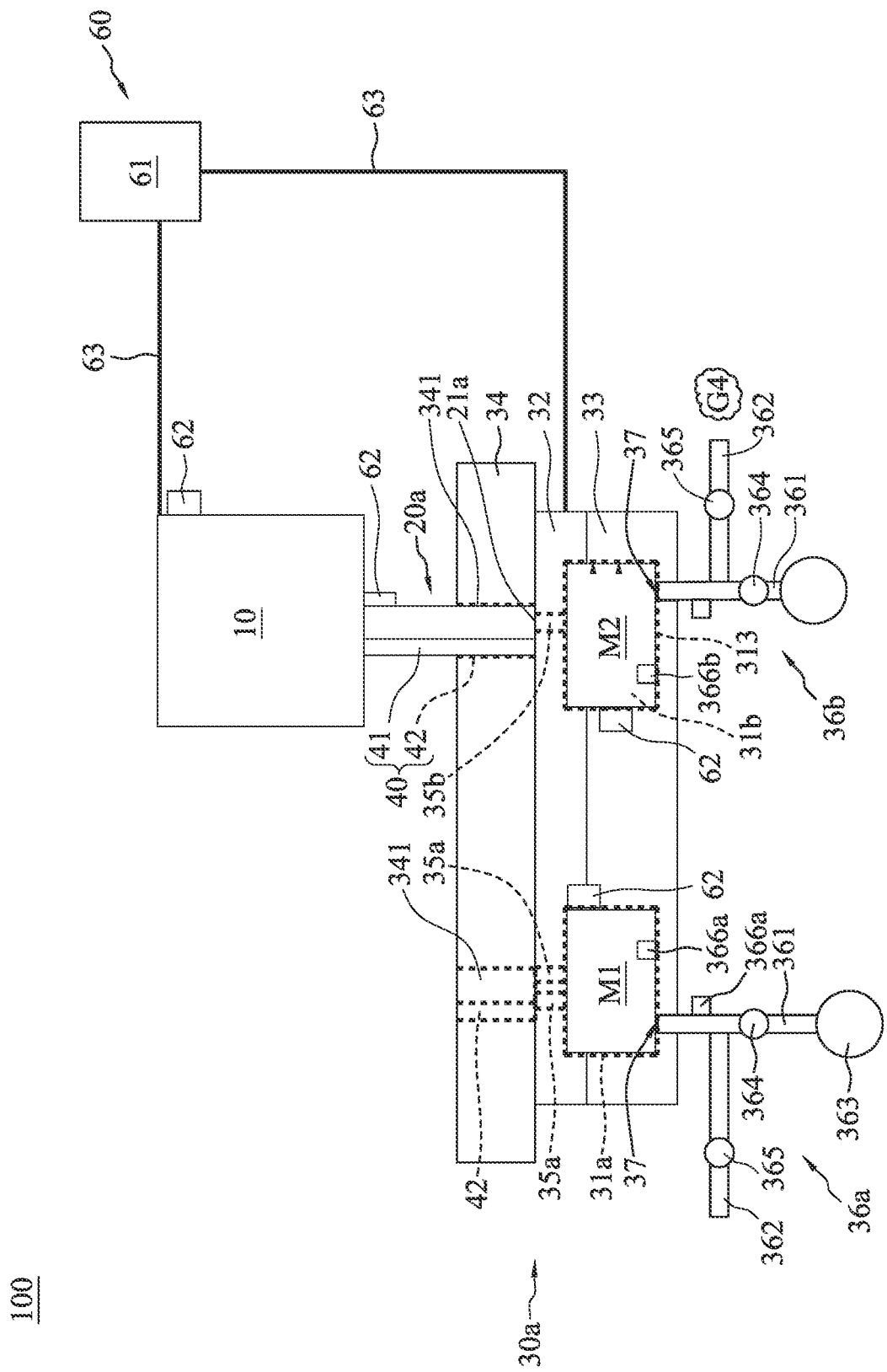

In some embodiments, referring to FIG. 18, the method 500 includes step 511, which includes injecting a second amount of the mixture M2 into the second mold cavity 31b having the second predetermined pressure through the first outlet 21a and the second feeding port 35b. In some embodiments, each of the first amount of the mixture M1 and the second amount of the mixture M2 has a predetermined ratio of the polymeric material to the blowing agent.

In some embodiments, after the second mold cavity 31b has the second predetermined pressure, the injection of the second amount of the mixture M2 begins. In some embodiments, the second mold cavity 31b has the second predetermined pressure before step 511, and the first valve 364 and the second valve 365 of the second pressure regulating system 36b are closed. In some embodiments, in step 511, the second amount of the mixture M2 is injected from the first discharging channel 20a into the second mold cavity 31b through the first outlet 21a and the second feeding port 35b. In some embodiments, the first discharging channel 20a is at least partially surrounded by the molding device 30a upon the injection of the second amount of the mixture M2. Injection of the second amount of the mixture M2 are respectively similar to step 506, and similar details are not repeated herein.

In some embodiments, in step 511, during the process of injecting the second amount of the mixture M2 into the second mold cavity 31b of the molding device 30a, the pressure in the second mold cavity 31b changes rapidly, and the second pressure-sensing unit 366b continuously senses the second pressure in the second mold cavity 31b. In some embodiments, the second amount of the mixture M2 is injected into the second mold cavity 31b of the molding device 30a from the second feeding port 35b, and the second predetermined pressure applies to the second amount of the mixture M2. In some embodiments, the second amount of the mixture M2 and the second gas G2 are disposed in the second mold cavity 31b, and the second amount of the mixture M2 will expand and foam in the second mold cavity 31b.

In some embodiments, the process of injecting the second amount of the mixture M2 into the second mold cavity 31 having the second predetermined pressure lasts for less than 1 second. During the injecting period or at the moment of the completion of the injection, the pressure in the second mold cavity 31b is sensed by the second pressure-sensing unit 366b in real time, and the pressure information is provided, so that the second pressure regulating system 36b can adjust the pressure in the second mold cavity 31b in accordance with the pressure information, and hence, the pressure in the second mold cavity 31b can be kept within the predetermined pressure range.

In some embodiments, the second amount of the mixture M2 is injected into the second mold cavity 31b of the molding device 30a from the second feeding port 35b, and thereby increasing the second pressure to a fourth pressure in the second mold cavity 31b having the second amount of the mixture M2. In some embodiments, the fourth pressure in the second mold cavity 31b having the second amount of the mixture M2 is greater than the second predetermined pressure. In some embodiments, the pressure in the second mold cavity 31b of the molding device 30a is raised from the second predetermined pressure to the fourth pressure. In some embodiments, the third pressure is different from the fourth pressure.

In some embodiments, the method 500 includes step 512, which includes sensing the fourth pressure in the second mold cavity 31b having the second amount of the mixture M2, and injecting a fourth gas into the second mold cavity 31b or discharging a portion of gas G4 from the second mold cavity 31b until the second mold cavity 31b is sensed to have a fourth predetermined pressure, wherein the third predetermined pressure is different from the fourth predetermined pressure.

In some embodiments, after the second amount of the mixture M2 is injected into the second mold cavity 31b having the second predetermined pressure, the pressure in the second mold cavity 31b increases, and therefore, the setting of the fourth predetermined pressure ensures that the second mold cavity 31b is maintained within a suitable pressure range. In some embodiments, when the second mold cavity 31b reaches the fourth predetermined pressure, the injection of the fourth gas into the second mold cavity 31b or discharging a portion of gas G4 from the second mold cavity 31b is stopped.

In some embodiments, in step 512, the gas G4 is discharged from the second mold cavity 31b after injecting the fourth gas into the second mold cavity 31b. In some embodiments, step 512 further includes foaming the second amount of the mixture M2 in the second mold cavity 31b, and discharging the gas G4 in less than 1 second from the second mold cavity 31b through the second pressure regulating system 36b while the second amount of the mixture M2 is foaming in the second mold cavity 31b. Due to the discharging of the gas G4, the second amount of the mixture M2 in the second mold cavity 31b after the foaming process may have a lower density. In some embodiments, the gas G4 is discharged from the second mold cavity 31b through the junction point 37 of the second pressure regulating system 36b. In some embodiments, the gas G4 is discharged from the second mold cavity 31b during or after the foaming process of the second amount of the mixture M2 in the second mold cavity 31b. In some embodiments, the fourth pressure in the second mold cavity 31b is decreased to the fourth predetermined pressure.

In some embodiments, when the second pressure-sensing unit 366b senses that the fourth pressure in the second mold cavity 31b is greater than the fourth predetermined pressure, the gas G4 in the second mold cavity 31b is discharged until the pressure in the second mold cavity 31b is within a predetermined pressure range. In some embodiments, the predetermined pressure range is between the second predetermined pressure and the fourth predetermined pressure. In some embodiments, the second valve 365 is open and a portion of the gas G4 in the second mold cavity 31b is discharged through the second gas conduit 362 of the second pressure regulating system 36b.

Figure 19:
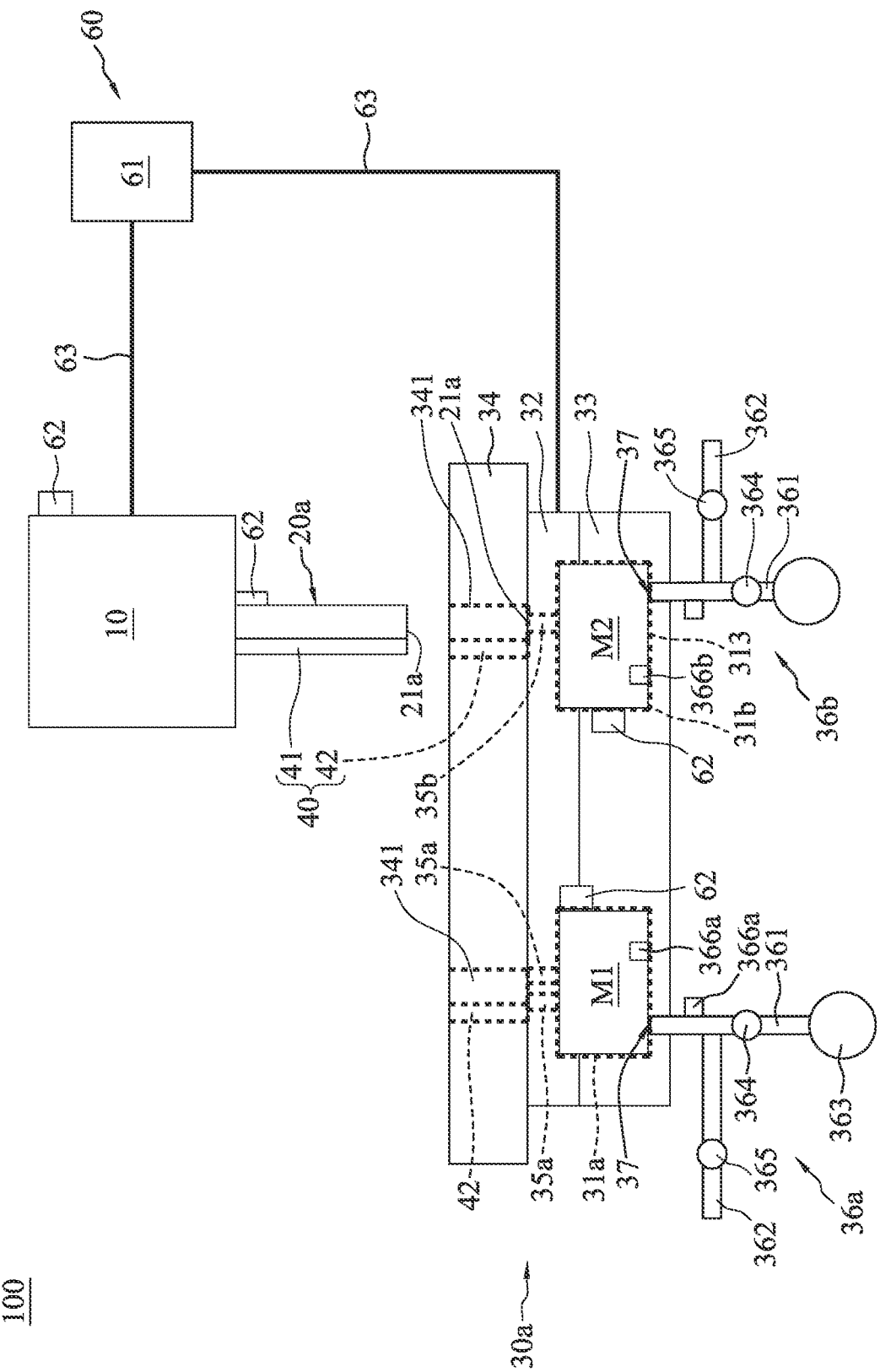

In some embodiments, referring to FIG. 19, the method 500 includes step 513, which includes disengaging the first outlet 21a from the second feeding port 35b. In some embodiments, after the injection of the second amount of the mixture M2 into the second mold cavity 31b, the first discharging channel 20a is disengaged from and moved away from the molding device 30a. In some embodiments, before the disengaging of the first outlet 21a from the second feeding port 35b, the supporting device 40 is shifted into the unlocked state.

In the above-mentioned step 501 to step 513 and the following process, the control system 60 automatically controls the extruding system 10, the first discharging channel 20a, the first and second mold cavities 31a, 31b, the supporting device 40 in real time. In some embodiments, the control system 60 controls movement of the extruding system 10 and the first discharging channel 20a. In some embodiments, the control system 60 controls movement of the molding devices 30a. In some embodiments, the control system 60 controls the injection of the first gas G1 into the first mold cavity 31a and the discharging of the portion of the first gas G1 from the first mold cavity 31a in accordance with the first pressure in the first mold cavity 31a, and control the injection of the second gas G2 into the second mold cavity 31b and the discharging of a portion of the second gas G2 from the second mold cavity 31b in accordance with the second pressure in the second mold cavity 31b.

Figure 20A:
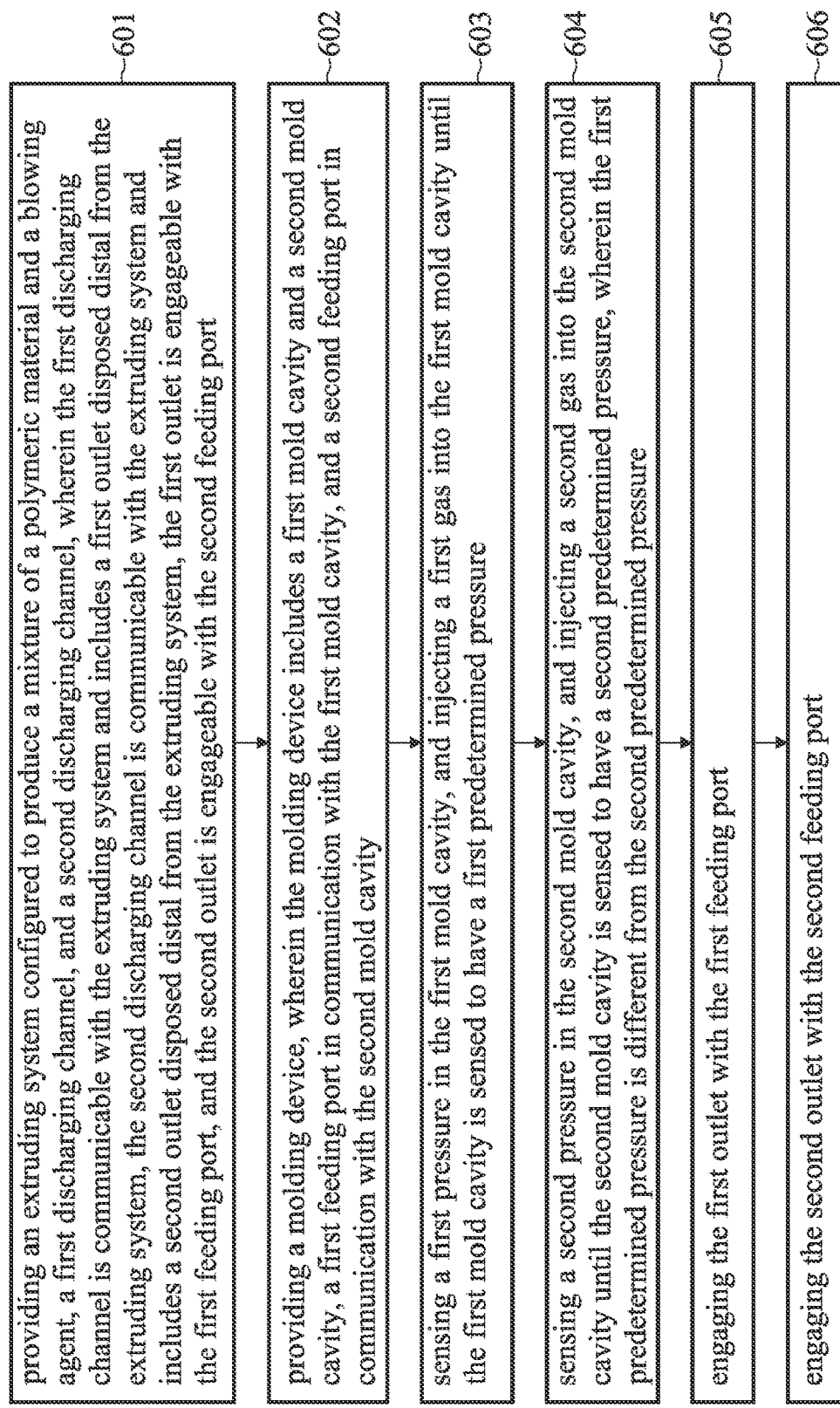

In the present disclosure, a method of injection molding is disclosed. In some embodiments, an injection molding is performed by the method. The method includes a number of operations and the description and illustrations are not deemed as a limitation of the sequence of the operations. FIG. 20A and FIG. 20B collectively illustrate a flowchart of a method 600 of injection molding according to one embodiment of the present invention. The method 600 is not limited to the above-mentioned embodiments. In some embodiments, the injection molding method 600 uses the above-mentioned injection molding system 200 as shown in FIG. 4.

Figure 21:
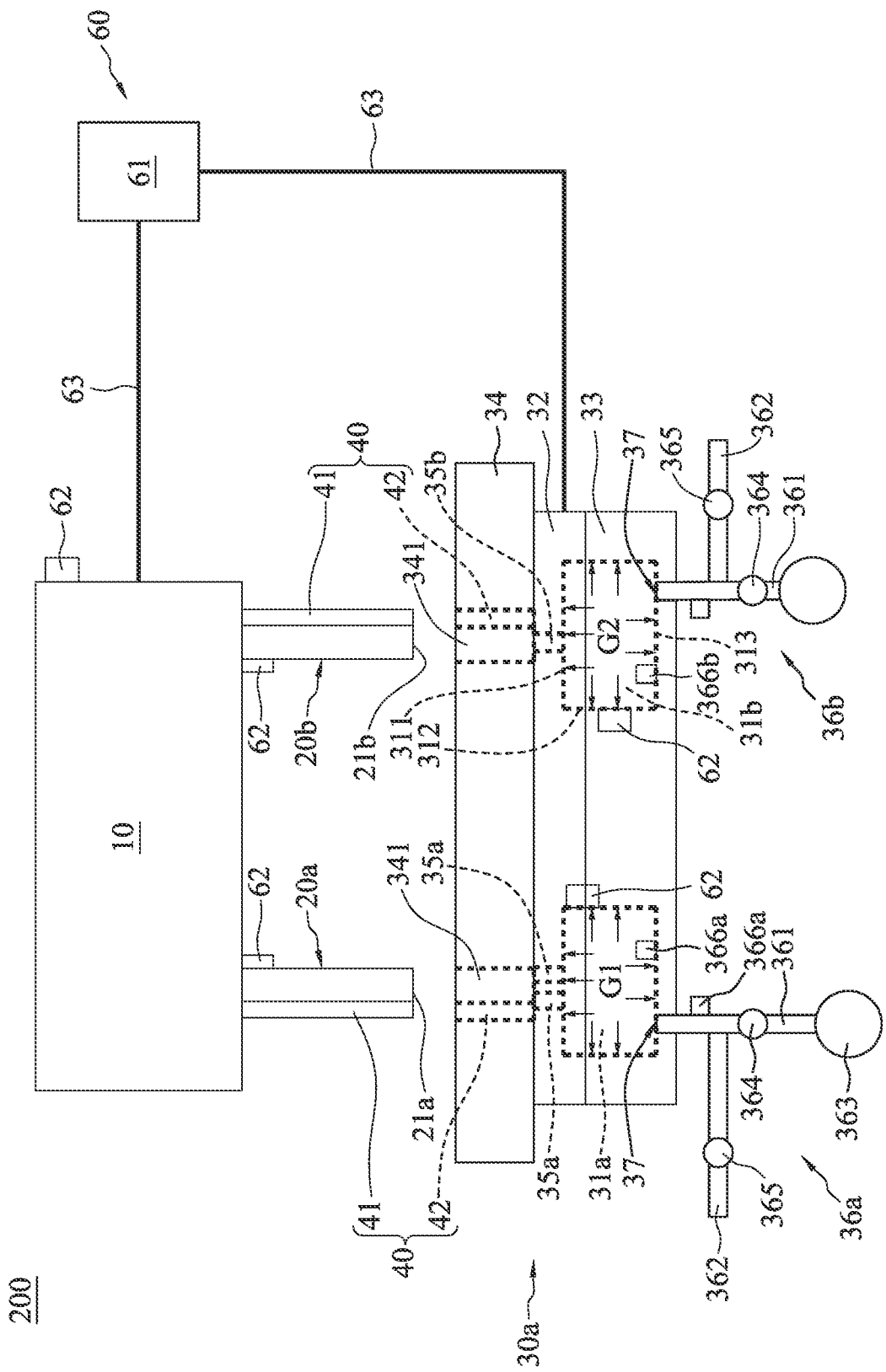
FIG. 21 to FIG. 24 are schematic diagrams illustrating exemplary operations for injection molding method according to one embodiment of the present disclosure.

In some embodiments, referring to FIG. 21, the injection molding method 600 includes step 601, which includes providing an extruding system 10 configured to produce a mixture of a polymeric material and a blowing agent, a first discharging channel 20a, and a second discharging channel 20b, wherein the first discharging channel 20a is communicable with the extruding system 10 and includes a first outlet 21a disposed distal from the extruding system 10, the second discharging channel 20b is communicable with the extruding system 10 and includes a second outlet 21b disposed distal from the extruding system 10, the first outlet 21a is engageable with the first feeding port 35a, and the second outlet 21b is engageable with the second feeding port 35b.

In some embodiments, the injection molding method 600 includes step 602, which includes providing a molding device 30b, wherein the molding device 30b includes a first mold cavity 31a and a second mold cavity 31b, a first feeding port 35a in communication with the first mold cavity 31a, and a second feeding port 35b in communication with the second mold cavity 31b.

In some embodiments, the injection molding method 600 includes step 603, which includes sensing a first pressure in the first mold cavity 31a, and injecting a first gas G1 into the first mold cavity 31a until the first mold cavity 31a is sensed to have a first predetermined pressure. In some embodiments, the process of performing step 603 is similar to the process of performing step 503, and a detailed description thereof is omitted here for the sake of brevity.

In some embodiments, the injection molding method 600 includes step 604, which includes sensing a second pressure in the second mold cavity 31b, and injecting a second gas G2 into the second mold cavity 31b until the second mold cavity 31b is sensed to have a second predetermined pressure, wherein the first predetermined pressure is different from the second predetermined pressure. In some embodiments, the process of performing step 604 is similar to the process of performing step 504, and a detailed description thereof is omitted here for the sake of brevity. In some embodiments, step 603 and step 604 are performed simultaneously or separately.

Figure 22:
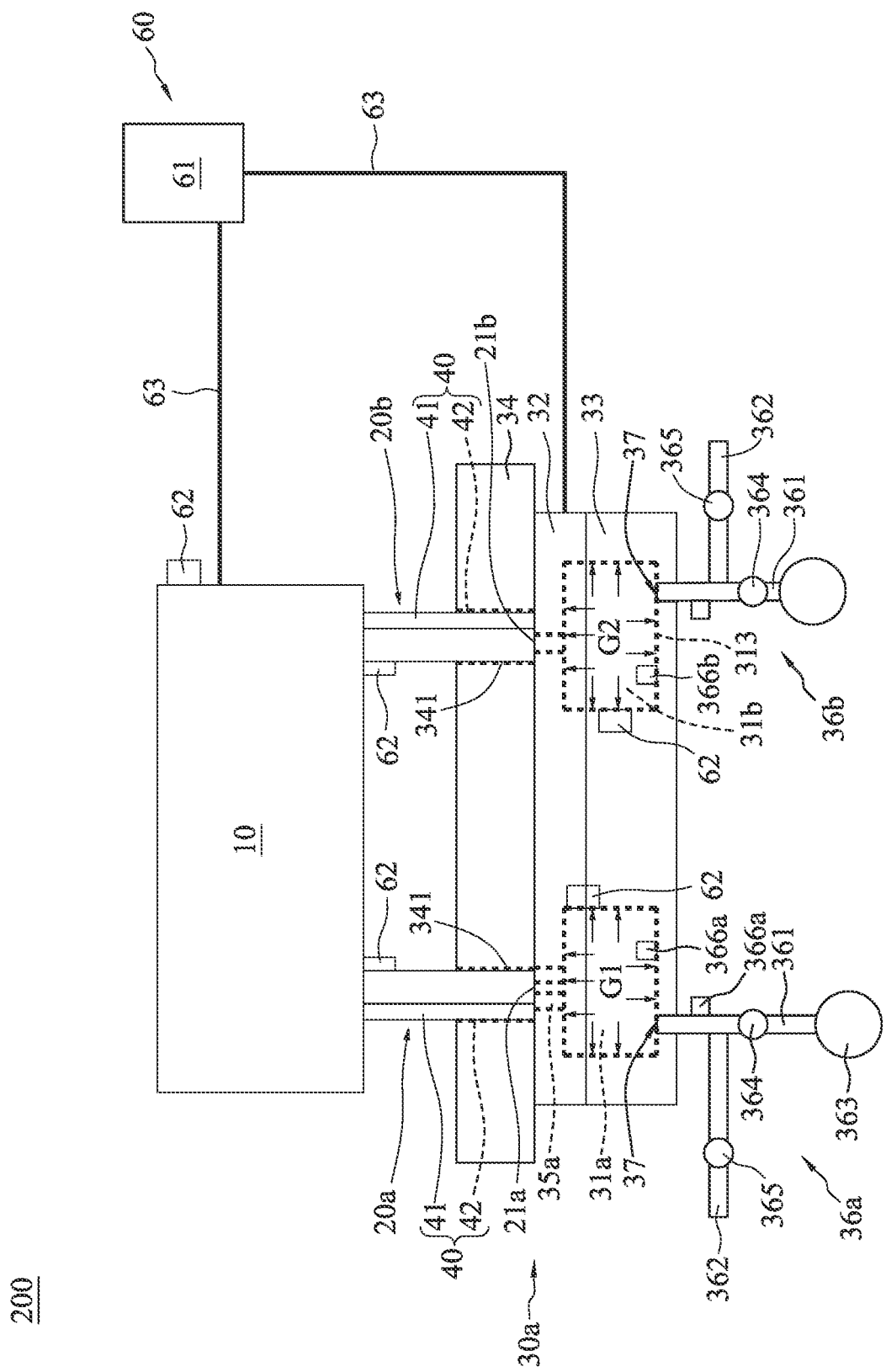

In some embodiments, referring to FIG. 22, the injection molding method 600 includes step 605, which includes engaging the first outlet 21a with the first feeding port 35a. In some embodiments, the process of performing step 605 is similar to the process of performing step 505, and a detailed description thereof is omitted here for the sake of brevity.

In some embodiments, the injection molding method 600 includes step 606, which includes engaging the second outlet 21b with the second feeding port 35b. In some embodiments, the process of performing step 606 is similar to the process of performing step 510, and a detailed description thereof is omitted here for the sake of brevity. In some embodiments, the engagement of the first outlet 21a with the first feeding port 35a in step 605 and the engagement of the second outlet 21b with the second feeding port 35b in step 606 are performed simultaneously.

Figure 23:
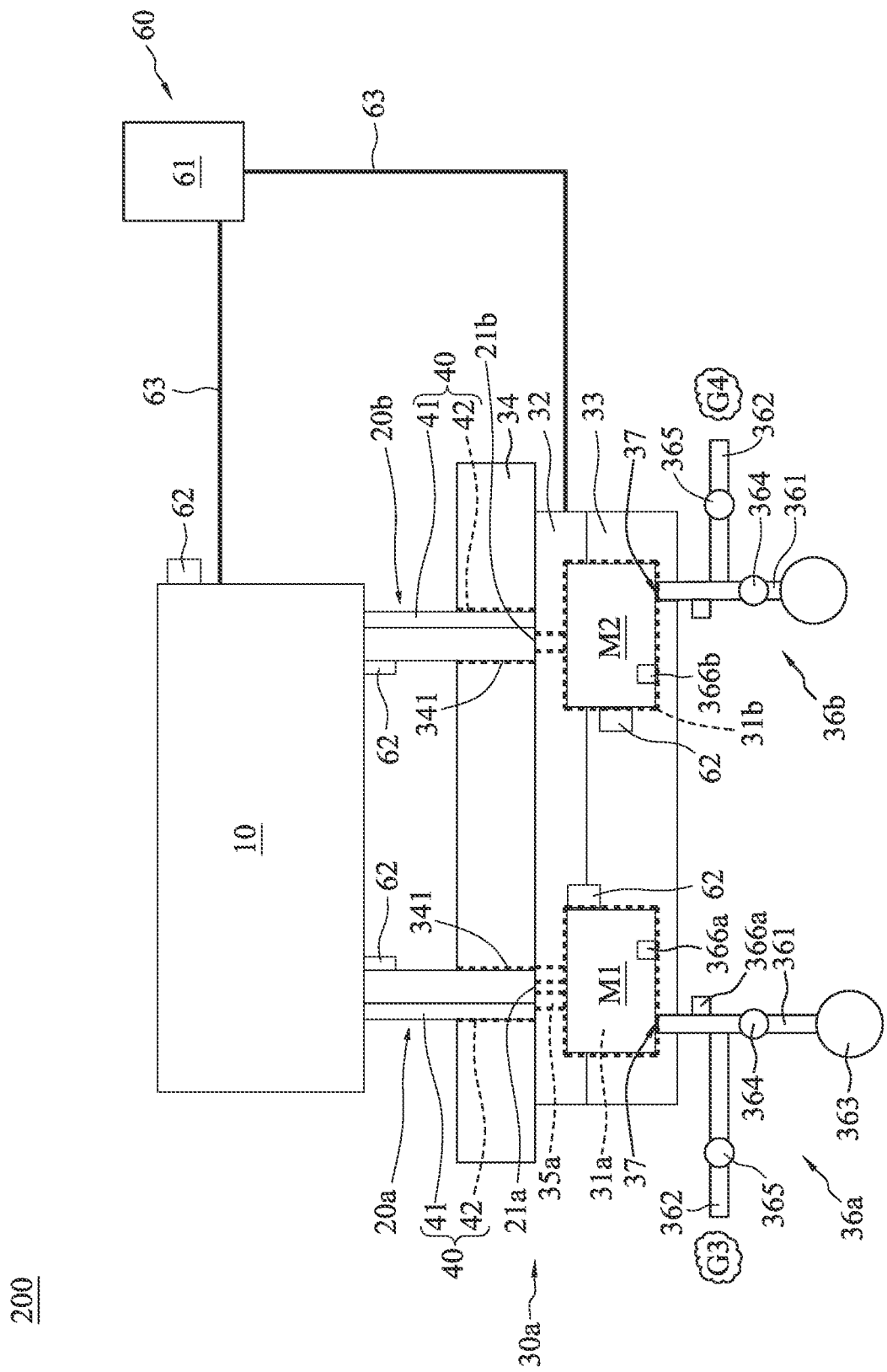

In some embodiments, referring to FIG. 23, the injection molding method 600 includes step 607, which includes injecting a first amount of the mixture M1 into the first mold cavity 31a having the first predetermined pressure through the first outlet 21a and the first feeding port 35a. In some embodiments, the process of performing step 607 is similar to the process of performing step 506, and a detailed description thereof is omitted here for the sake of brevity.

In some embodiments, the injection molding method 600 includes step 608, which includes injecting a second amount of the mixture M2 into the second mold cavity 31b having the second predetermined pressure through the second outlet 21b and the second feeding port 35b. In some embodiments, the process of performing step 608 is similar to the process of performing step 511, and a detailed description thereof is omitted here for the sake of brevity. In some embodiments, the injection the first amount of the mixture M1 and the injection the second amount of the mixture M2 are performed simultaneously or separately.

In some embodiments, the injection molding method 600 includes step 609, which includes sensing a third pressure in the first mold cavity 31a having the first amount of the mixture M1, and injecting a third gas into the first mold cavity 31a or discharging a portion of gas G3 from the first mold cavity 31a until the first mold cavity 31a is sensed to have a third predetermined pressure. In some embodiments, the process of performing step 609 is similar to the process of performing step 507, and a detailed description thereof is omitted here for the sake of brevity.

In some embodiments, the injection molding method 600 includes step 610, which includes sensing a fourth pressure in the second mold cavity 31b having the second amount of the mixture M2, and injecting a fourth gas into the second mold cavity 31b or discharging a portion of gas G4 from the second mold cavity 31b until the second mold cavity 31b is sensed to have a fourth predetermined pressure. In some embodiments, the third predetermined pressure is different from the fourth predetermined pressure. In some embodiments, the process of performing step 610 is similar to the process of performing step 512, and a detailed description thereof is omitted here for the sake of brevity. In some embodiments, step 609 and step 610 are performed simultaneously or separately.

Figure 24:
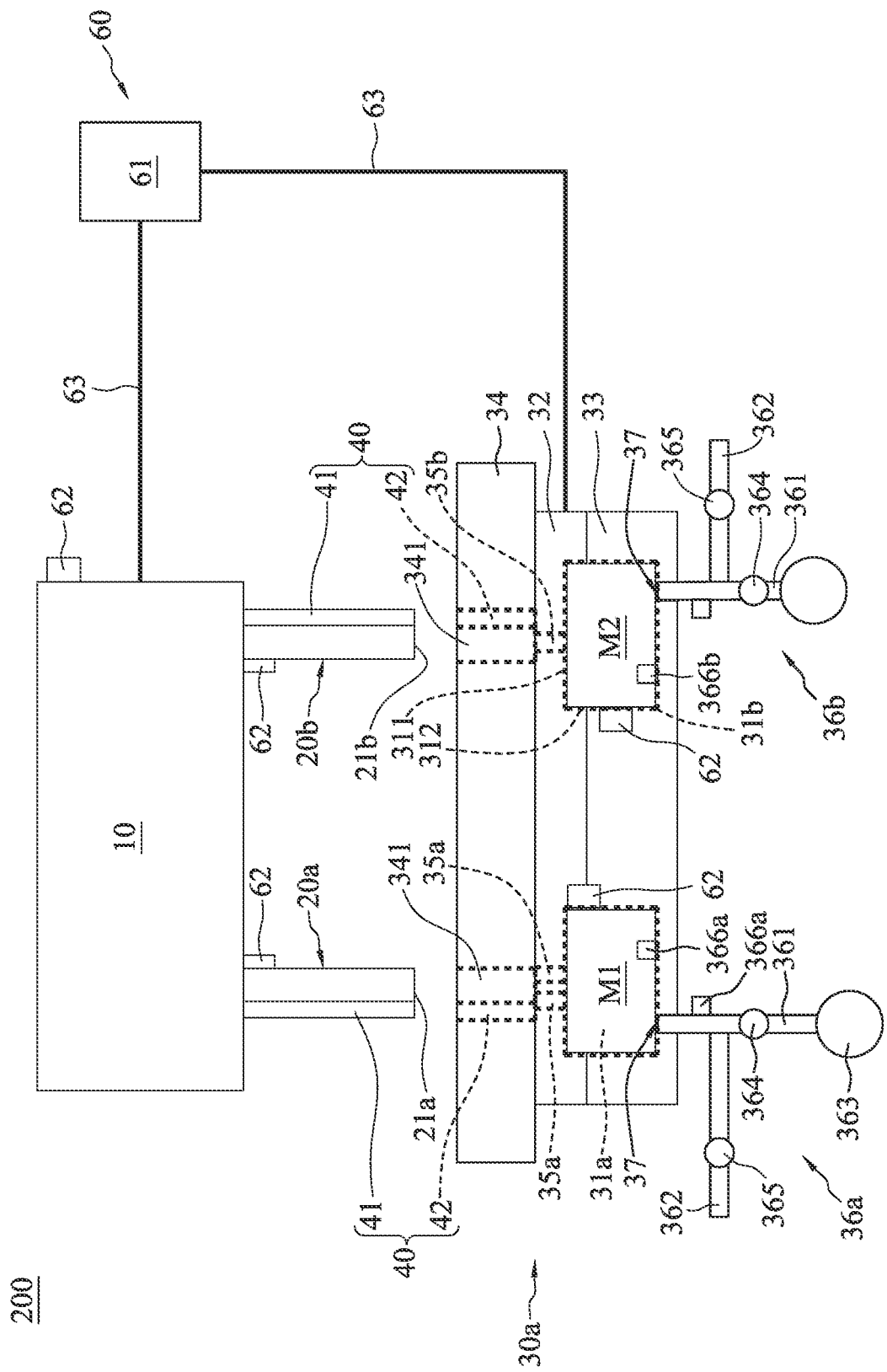

In some embodiments, referring to FIG. 24, the injection molding method 600 includes step 611, which includes disengaging the first outlet 21a from the first feeding port 35a and the second outlet 21b from the second feeding port 35b. In some embodiments, disengaging the first outlet 21a from the first feeding port 35a and disengaging the second outlet 21b from the second feeding port 35b are performed simultaneously.

Figure 25:
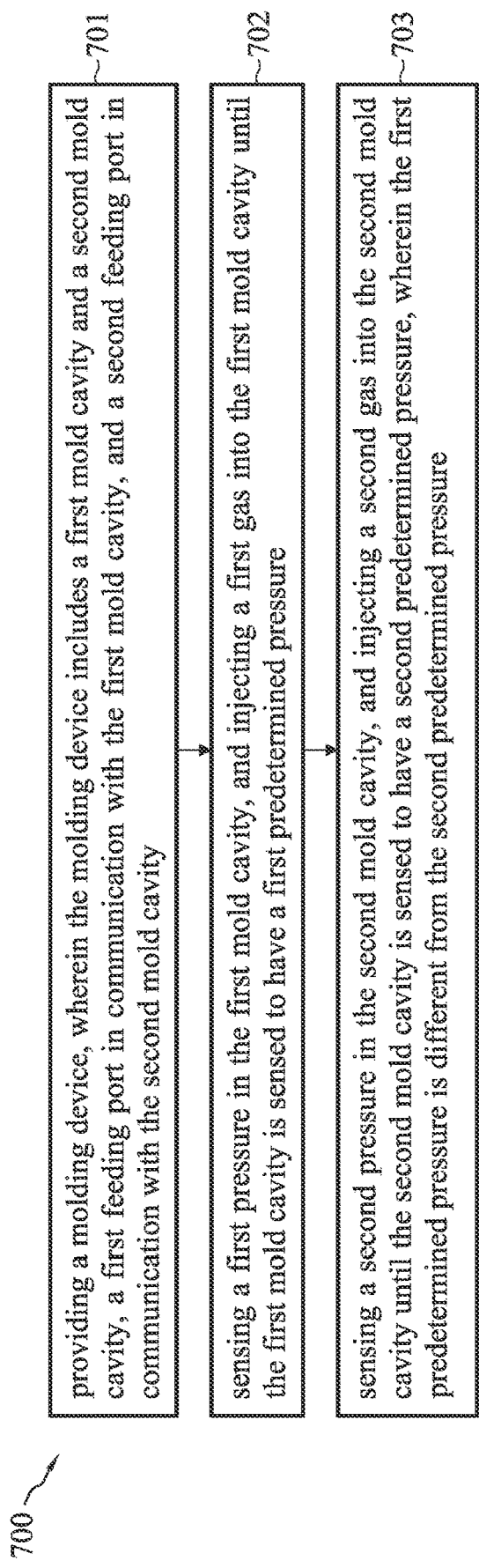
FIG. 25 is a flowchart illustrating an injection molding method according to one embodiment of the present invention.

In the present disclosure, a method of injection molding is disclosed. The method includes a number of operations and the description and illustrations are not deemed as a limitation of the sequence of the operations. FIG. 25 is a flowchart illustrating a method 700 of injection molding according to one embodiment of the present invention. The method 700 is not limited to the above-mentioned embodiments. In some embodiments, the injection molding method 700 uses the above-mentioned injection molding system 100 as shown in FIG. 1 or the above-mentioned injection molding system 200 as shown in FIG. 4. In some embodiments, as shown in FIG. 25, the method 700 includes the following steps.

Step 701 includes providing a molding device, wherein the molding device includes a first mold cavity and a second mold cavity, a first feeding port in communication with the first mold cavity, and a second feeding port in communication with the second mold cavity.

Step 702 includes sensing a first pressure in the first mold cavity, and injecting a first gas into the first mold cavity until the first mold cavity is sensed to have a first predetermined pressure.

Step 703 includes sensing a second pressure in the second mold cavity, and injecting a second gas into the second mold cavity until the second mold cavity is sensed to have a second predetermined pressure, wherein the first predetermined pressure is different from the second predetermined pressure.

Figure 26A:
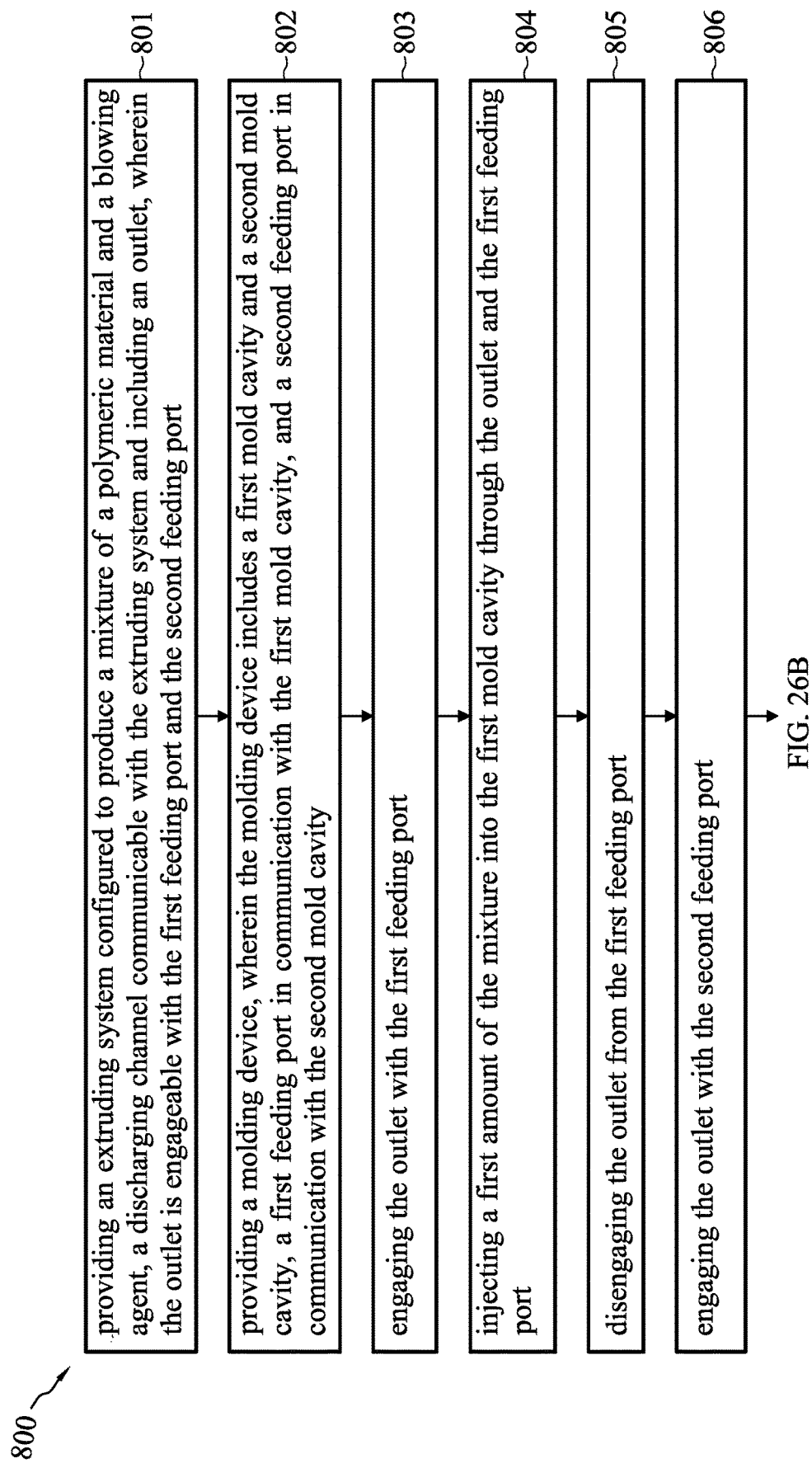
FIG. 26A and FIG. 26B collectively illustrate a flowchart of an injection molding method according to one embodiment of the present invention.
Figures 26A, 26B:
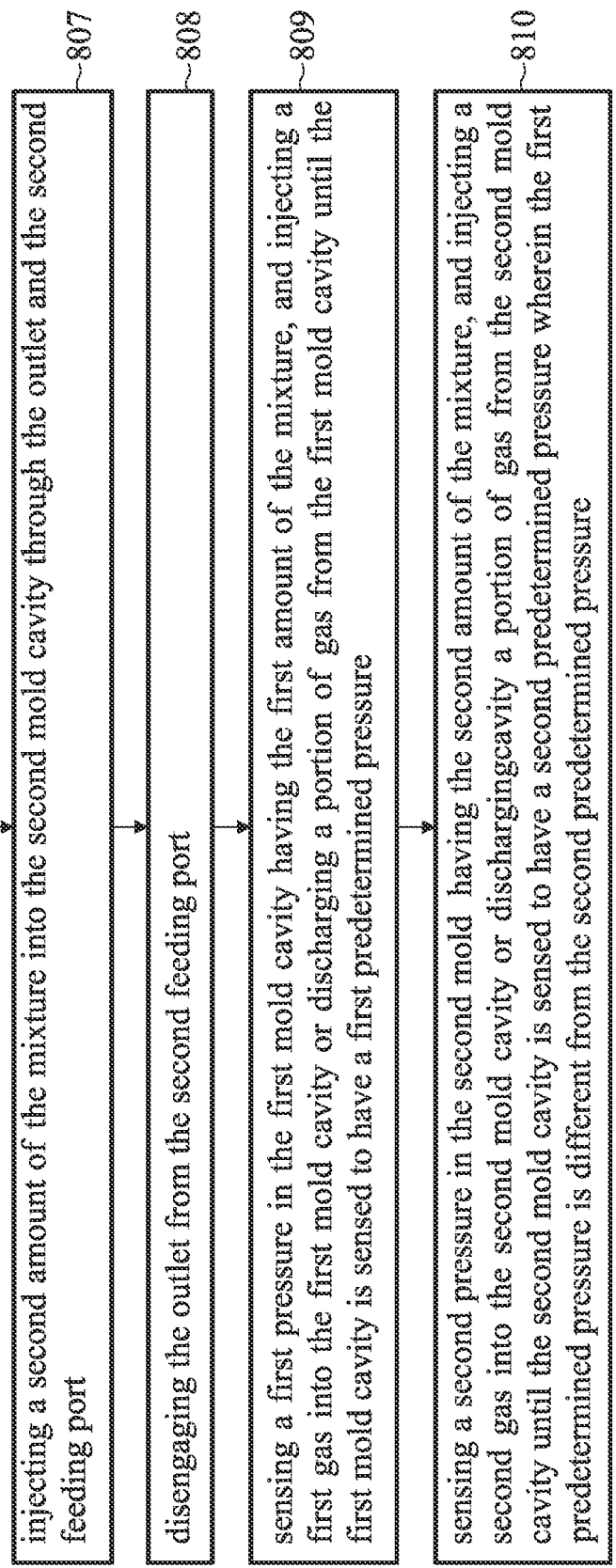

In the present disclosure, a method of injection molding is disclosed. The method includes a number of operations and the description and illustrations are not deemed as a limitation of the sequence of the operations. FIG. 26A and FIG. 26B collectively illustrate a flowchart of a method 800 of injection molding according to one embodiment of the present invention. The method 800 is not limited to the above-mentioned embodiments. In some embodiments, the injection molding method 800 uses the above-mentioned injection molding system 100 as shown in FIG. 1 or the above-mentioned injection molding system 200 as shown in FIG. 4. In some embodiments, as shown in FIG. 26A and FIG. 26B, the method 800 includes the following steps.

Step 801 includes providing an extruding system configured to produce a mixture of a polymeric material and a blowing agent, a discharging channel communicable with the extruding system and including an outlet, wherein the outlet is engageable with the first feeding port and the second feeding port.

Step 802 includes providing a molding device, wherein the molding device includes a first mold cavity and a second mold cavity, a first feeding port in communication with the first mold cavity, and a second feeding port in communication with the second mold cavity.

Step 803 includes engaging the outlet with the first feeding port.

Step 804 includes injecting a first amount of the mixture into the first mold cavity through the outlet and the first feeding port.

Step 805 includes disengaging the outlet from the first feeding port.

Step 806 includes engaging the outlet with the second feeding port.

Step 807 includes injecting a second amount of the mixture into the second mold cavity through the outlet and the second feeding port.

Step 808 includes disengaging the outlet from the second feeding port.

Step 809 includes sensing a first pressure in the first mold cavity having the first amount of the mixture, and injecting a first gas into the first mold cavity or discharging a portion of gas from the first mold cavity until the first mold cavity is sensed to have a first predetermined pressure.

Step 810 includes sensing a second pressure in the second mold cavity having the second amount of the mixture, and injecting a second gas into the second mold cavity or discharging a portion of gas from the second mold cavity until the second mold cavity is sensed to have a second predetermined pressure wherein the first predetermined pressure is different from the second predetermined pressure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding method, comprising:
providing an extruding system configured to produce a mixture of a polymeric material and a blowing agent, a first discharging channel communicable with the extruding system and including a first outlet disposed distal to the extruding system;
providing a molding device, wherein the molding device includes a first mold cavity and a second mold cavity separated from the first mold cavity, a first feeding port in communication with the first mold cavity, and a second feeding port in communication with the second mold cavity, wherein the first outlet is engageable with the first feeding port and the second feeding port respectively;
sensing a first pressure in the first mold cavity, and injecting a first gas into the first mold cavity until the first mold cavity is sensed to have a first predetermined pressure;
sensing a second pressure in the second mold cavity, and injecting a second gas into the second mold cavity until the second mold cavity is sensed to have a second predetermined pressure,
injecting a first amount of the mixture into the first mold cavity having the first predetermined pressure through the first feeding port;
injecting a second amount of the mixture into the second mold cavity having the second predetermined pressure through the second feeding port;
foaming the first amount of the mixture in the first mold cavity;
foaming the second amount of the mixture in the second mold cavity;
discharging at least a portion of the first gas from the first mold cavity during or after the foaming of the first amount of the mixture in the first mold cavity until the first mold cavity is sensed to have a third predetermined pressure; and
discharging at least a portion of the second gas from the second mold cavity during or after the foaming of the second amount of the mixture in the second mold cavity until the second mold cavity is sensed to have a fourth predetermined pressure,
wherein the first predetermined pressure is different from the second predetermined pressure, and the third predetermined pressure is different from the fourth predetermined pressure.

2. The method of claim 1, wherein the injection of the first gas and the injection of the second gas are performed separately.

3. The method of claim 1, further comprising:
engaging the first outlet with the first feeding port;
disengaging the first outlet from the first feeding port;
moving the first discharging channel away from the first mold cavity and toward the second mold cavity;
engaging the first outlet with the second feeding port; and
disengaging the first outlet from the second feeding port,
wherein the second amount of the mixture is injected into the second mold cavity through the first outlet and the second feeding port.

4. The method of claim 1, further comprising:
providing a second discharging channel communicable with the extruding system and including a second outlet disposed distal from the extruding system, and the second outlet is engageable with the second feeding port;
engaging the first outlet with the first feeding port; and
engaging the second outlet with the second feeding port,
wherein the second amount of the mixture is injected into the second mold cavity through the second outlet and the second feeding port.

5. The method of claim 4, wherein the engagement of the first outlet with the first feeding port and the engagement of the second outlet with the second feeding port are performed simultaneously, and the injection of the first amount of the mixture and the injection of the second amount of the mixture are performed simultaneously.

6. The method of claim 3, wherein the portion of the first gas is discharged in less than 1 second from the first mold cavity through a first pressure regulating system.

7. The method of claim 6, wherein at least the portion of the first gas is discharged from the first mold cavity through a junction point of the first pressure regulating system, the first mold cavity is defined by a first sidewall, and the junction point is disposed at the first sidewall and in communication with the first mold cavity.

8. The method of claim 7, wherein the junction point includes a first opening and a second opening, a first gas conduit is coupled to the first opening and the second opening is in communication with the first mold cavity via the junction point.

9. The method of claim 4, wherein the first discharging channel and the second discharging channel have widths same as each other.

10. An injection molding method, comprising:
providing an extruding system configured to produce a mixture of a polymeric material and a blowing agent, a discharging channel communicable with the extruding system and including an outlet;
providing a molding device, wherein the molding device includes a first mold cavity and a second mold cavity, a first feeding port in communication with the first mold cavity, and a second feeding port in communication with the second mold cavity, wherein the outlet is engageable with the first feeding port and the second feeding port;
engaging the outlet with the first feeding port;
injecting a first amount of the mixture into the first mold cavity through the outlet and the first feeding port;
disengaging the outlet from the first feeding port;
foaming the first amount of the mixture in the first mold cavity;
engaging the outlet with the second feeding port;
injecting a second amount of the mixture into the second mold cavity through the outlet and the second feeding port;
disengaging the outlet from the second feeding port;
foaming the second amount of the mixture in the second mold cavity;
sensing a first pressure in the first mold cavity having the first amount of the mixture, and during the foaming of the first amount of the mixture in the first mold cavity, injecting a first gas into the first mold cavity or discharging a portion of gas from the first mold cavity in less than 1 second until the first mold cavity is sensed to have a first predetermined pressure; and
sensing a second pressure in the second mold cavity having the second amount of the mixture, and during the foaming of the second amount of the mixture in the second mold cavity, injecting a second gas into the second mold cavity or discharging a portion of gas from the second mold cavity until the second mold cavity is sensed to have a second predetermined pressure;
wherein the first predetermined pressure is different from the second predetermined pressure.

11. The method of claim 10, wherein the first pressure in the first mold cavity is sensed continuously during the injecting the first amount of the mixture into the first mold cavity, and when the first pressure of the first mold cavity is sensed to be greater than the first predetermined pressure, the portion of the gas in the first mold cavity is discharged from the first mold cavity.

12. The method of claim 11, further comprising providing a control system configured to control the injection of the first gas into the first mold cavity and the discharging of the portion of the gas from the first mold cavity in accordance with the first pressure in the first mold cavity, and control the injection of the second gas into the second mold cavity and the discharging of the portion of the gas from the second mold cavity in accordance with the second pressure in the second mold cavity.

13. The method of claim 12, wherein the first pressure and the second pressure are sensed in real time, and the control system controls the first pressure and the second pressure in real time.

14. The method of claim 10, further comprising:
injecting a third gas into the first mold cavity before the injection of the first amount of the mixture into the first mold cavity; and
injecting a fourth gas into the second mold cavity before the injection of the second amount of the mixture into the second mold cavity.

15. The method of claim 10, further comprising:
moving the discharging channel away from the first mold cavity toward the second mold cavity.

16. The method of claim 10, further comprising:
securing the discharging channel to the molding device to dock the outlet to the first feeding port.

17. The method of claim 16, wherein the discharging channel is secured to the molding device by switching a supporting device to a lock state.

18. The method of claim 17, further comprising:
switching the supporting device to an unlocked state before the disengaging of the outlet from the first feeding port.

19. The method of claim 10, further comprising:
engaging a first element of a supporting device with a second element of the supporting device to secure the discharging channel with the molding device; and
providing a force by the supporting device to prevent separation of the extruding system from the molding device.

20. The method of claim 19, further comprising controlling the supporting device in a real time by a control system.

* * * * *